United States Patent
Bienkowski et al.

(10) Patent No.: US 10,229,096 B1
(45) Date of Patent: Mar. 12, 2019

(54) AUTOMATIC GENERATION OF A PRESENTATION FROM CODE BASED ON ANALYSIS OF AN INTERMEDIATE VERSION OF THE CODE

(71) Applicant: The MathWorks, Inc., Natick, MA (US)

(72) Inventors: Joseph R. Bienkowski, Ashland, MA (US); Amit Mahajan, Natick, MA (US); Claudia G. Wey, Wayland, MA (US); Joseph F. Hicklin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 239 days.

(21) Appl. No.: 15/148,489

(22) Filed: May 6, 2016

(51) Int. Cl.
| | |
|---|---|
| *G06F 17/00* | (2006.01) |
| *G06F 17/21* | (2006.01) |
| *G06F 17/24* | (2006.01) |
| *G06F 17/27* | (2006.01) |
| *G06F 17/22* | (2006.01) |

(52) U.S. Cl.
CPC ........ *G06F 17/2288* (2013.01); *G06F 17/211* (2013.01); *G06F 17/2211* (2013.01); *G06F 17/241* (2013.01)

(58) Field of Classification Search
CPC ...... G06F 17/211; G06F 17/212; G06F 17/24; G06F 17/3089; G06F 17/30905
See application file for complete search history.

(56) References Cited

U.S. PATENT DOCUMENTS

| | | | | |
|---|---|---|---|---|
| 6,249,281 | B1 * | 6/2001 | Chen | G06F 3/0483 715/723 |
| 8,056,053 | B1 * | 11/2011 | Gulley | G06F 9/45508 717/110 |
| 8,762,956 | B1 | 6/2014 | Simoneau et al. | |
| 2008/0104082 | A1 * | 5/2008 | Gimson | G06F 17/248 |
| 2010/0114991 | A1 * | 5/2010 | Chaudhary | G06F 17/3002 707/809 |
| 2012/0221449 | A1 * | 8/2012 | Kief | G06F 17/2241 705/34 |

(Continued)

OTHER PUBLICATIONS

Rob Pike, "Google I/O 2012—Go Concurrency Patter," Jul. 2, 2012, www.youtube.com/watch?v=f6kdp27TYZs, 6:13-7:19.*

*Primary Examiner* — Ariel Mercado
(74) *Attorney, Agent, or Firm* — Harrity & Harrity, LLP

(57) ABSTRACT

A device analyzes program code to generate an intermediate version of the program code. When analyzing the program code, the device applies first rules for mapping portions of the program code to different portions of the intermediate version of the program code. The device generates the intermediate version of the program code that the different portions of the intermediate version of the program code mapped from the portions of the program code. The device applies, to the intermediate version of the program code, second rules for determining first portions of the intermediate version of the program code to keep together and second portions of the intermediate version of the program code to keep separate in a presentation to be generated from the program code, and generates the presentation from the program code based on applying the second rules to the intermediate version of the program code.

22 Claims, 25 Drawing Sheets

(56) References Cited

U.S. PATENT DOCUMENTS

2014/0281855 A1* 9/2014 Bhatnagar ......... G06F 17/30879
 715/205
2016/0188125 A1* 6/2016 Kaplan ................ G06F 17/241
 715/730

* cited by examiner

FIG. 1A

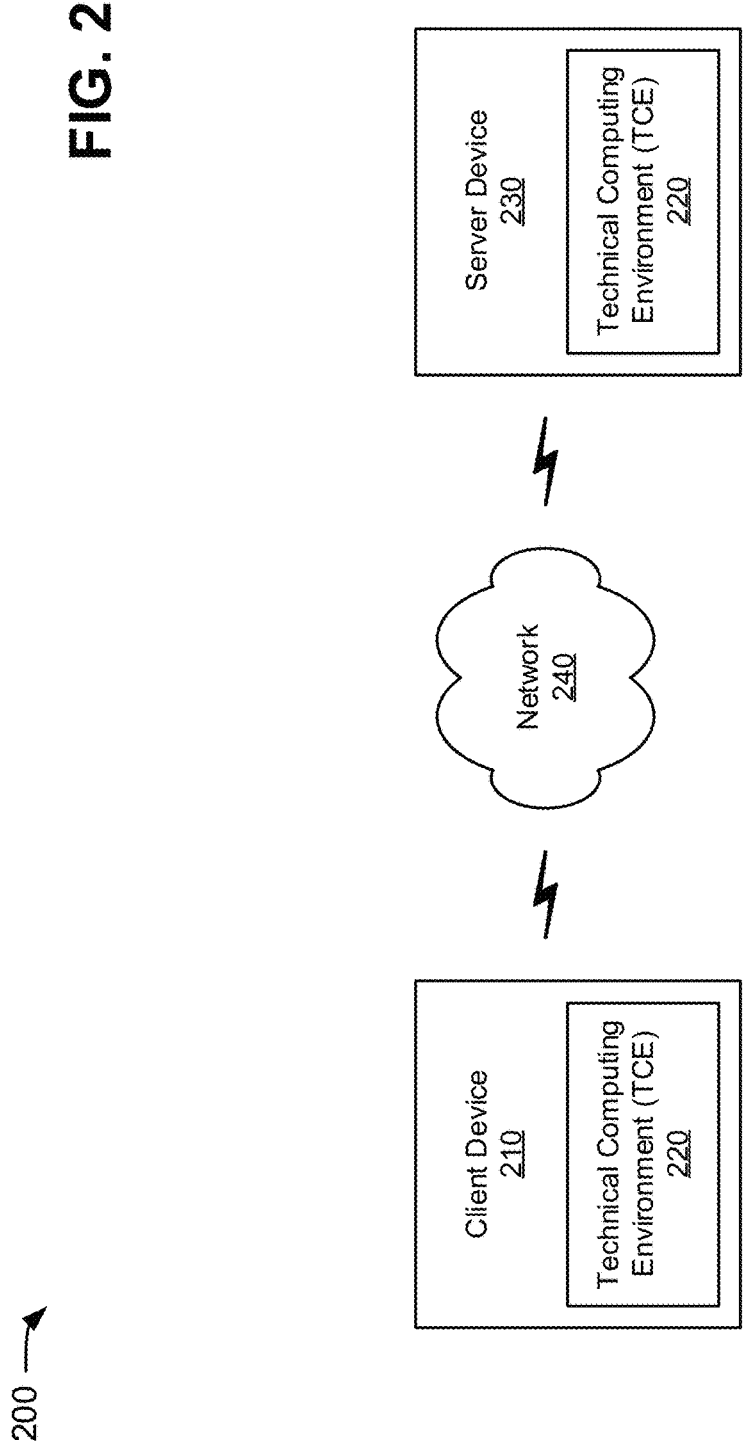

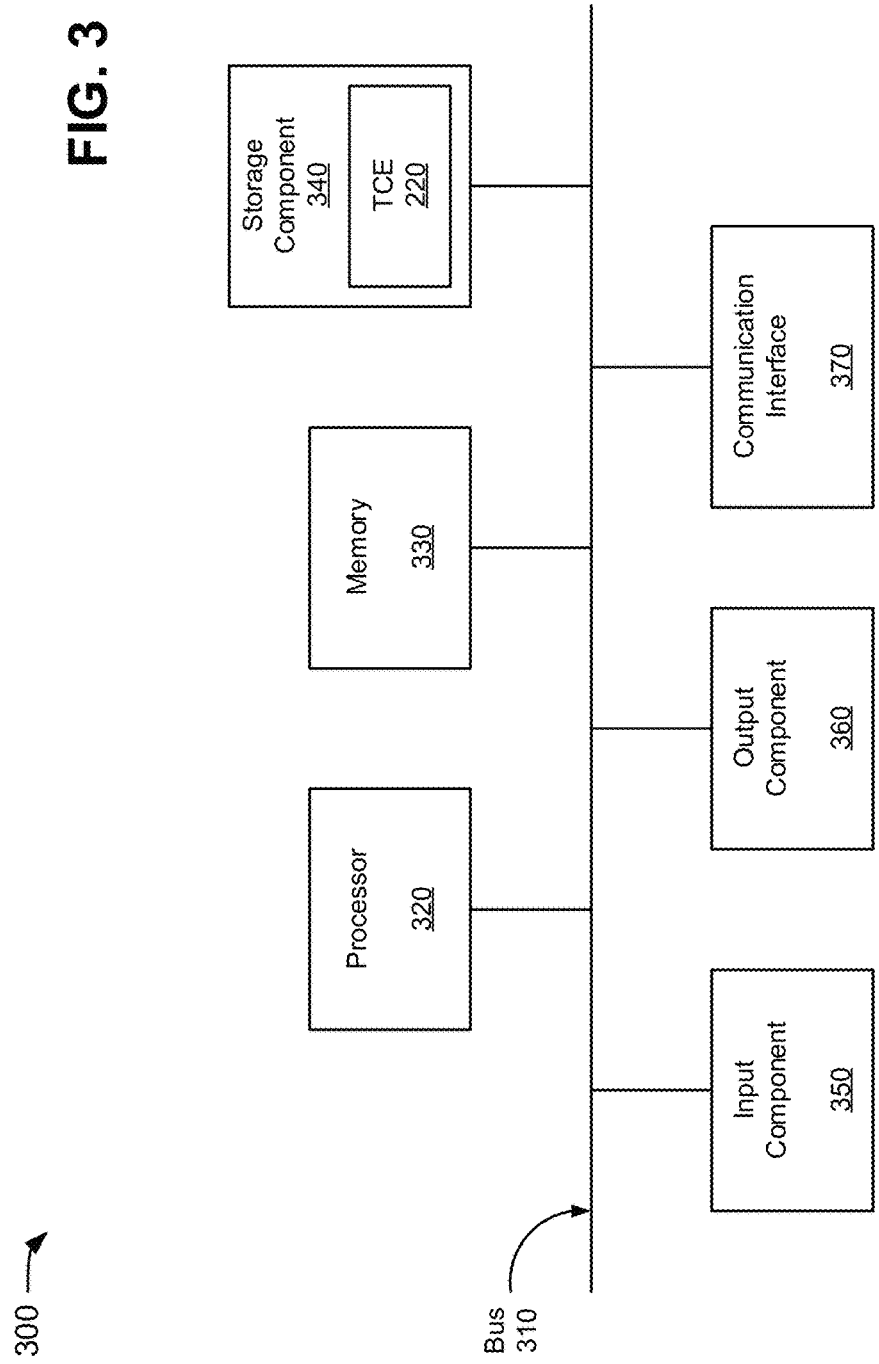

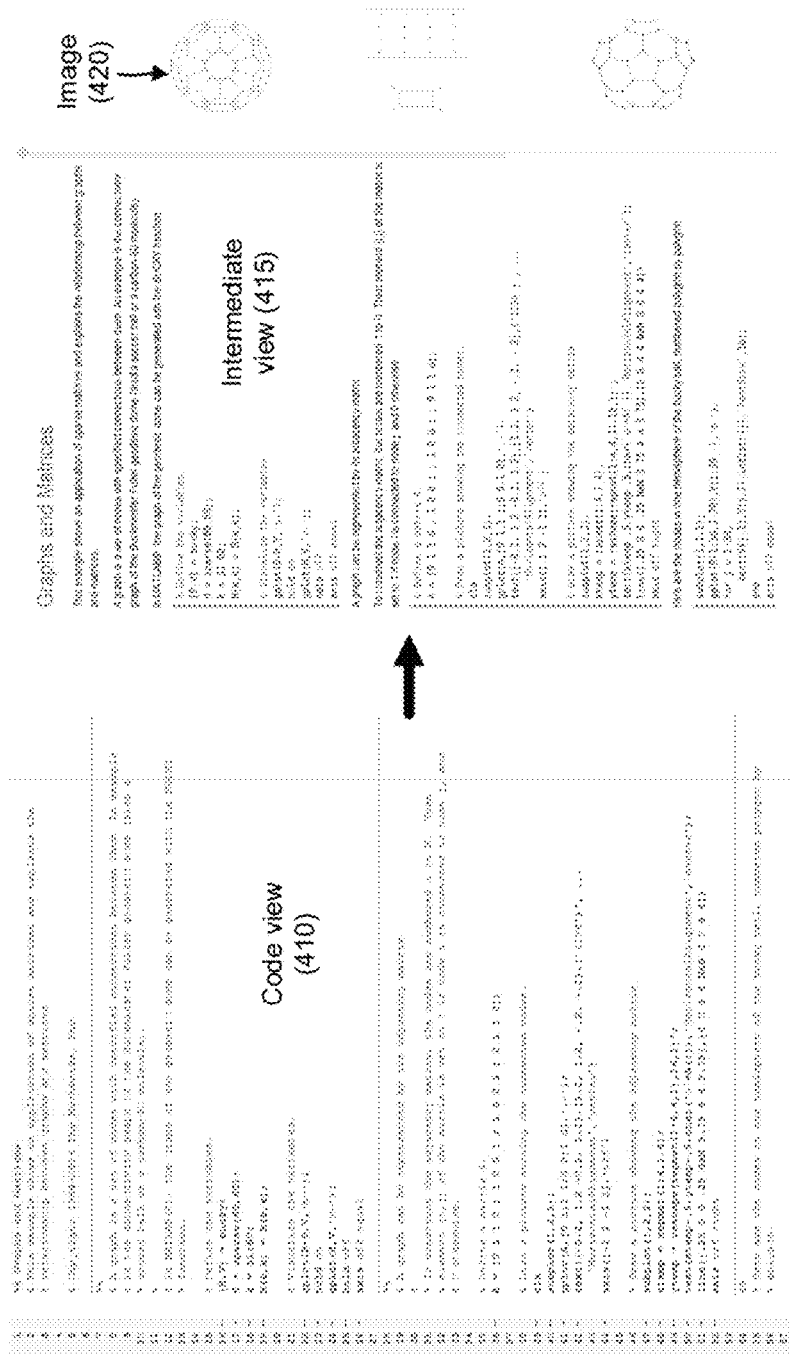

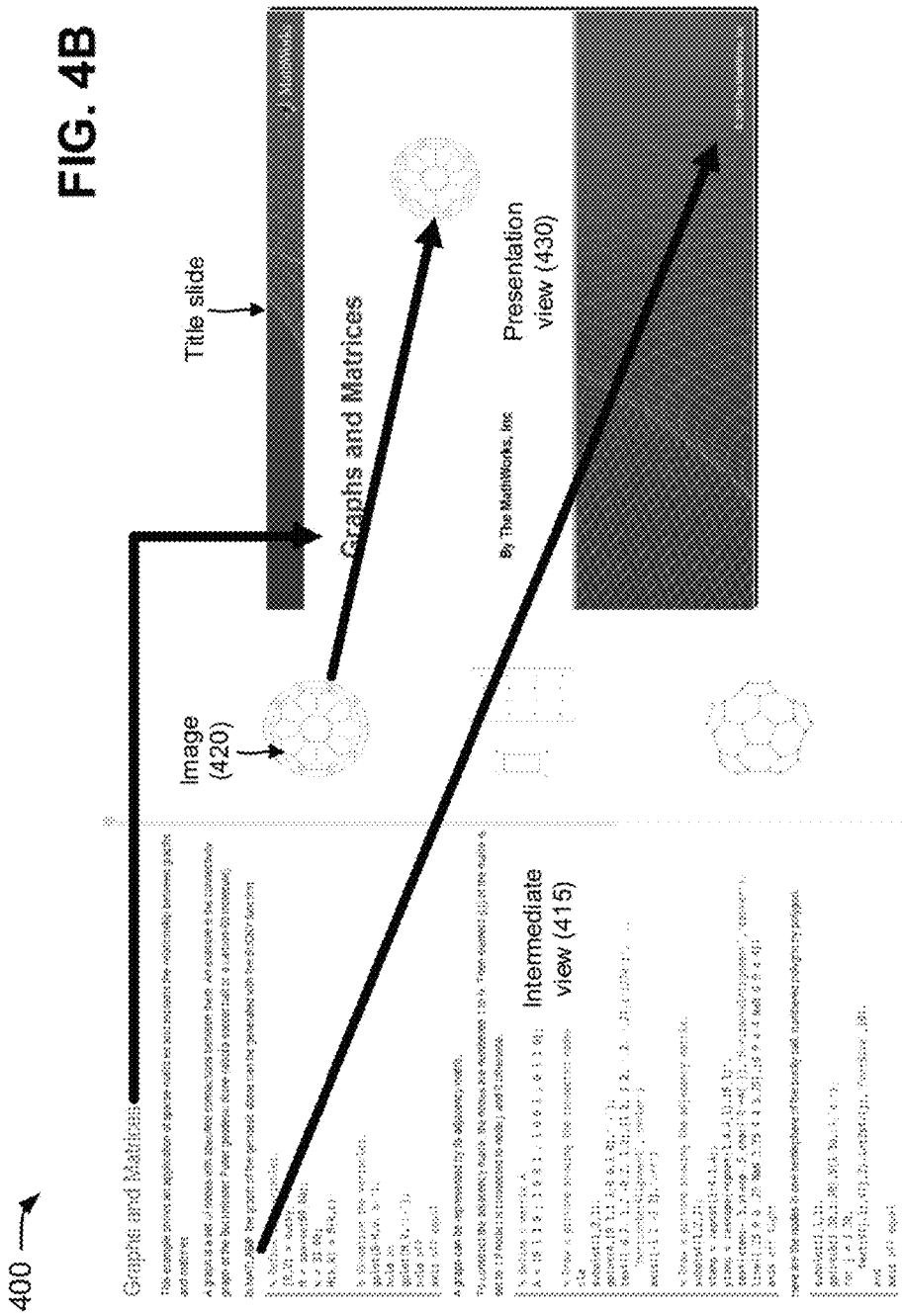

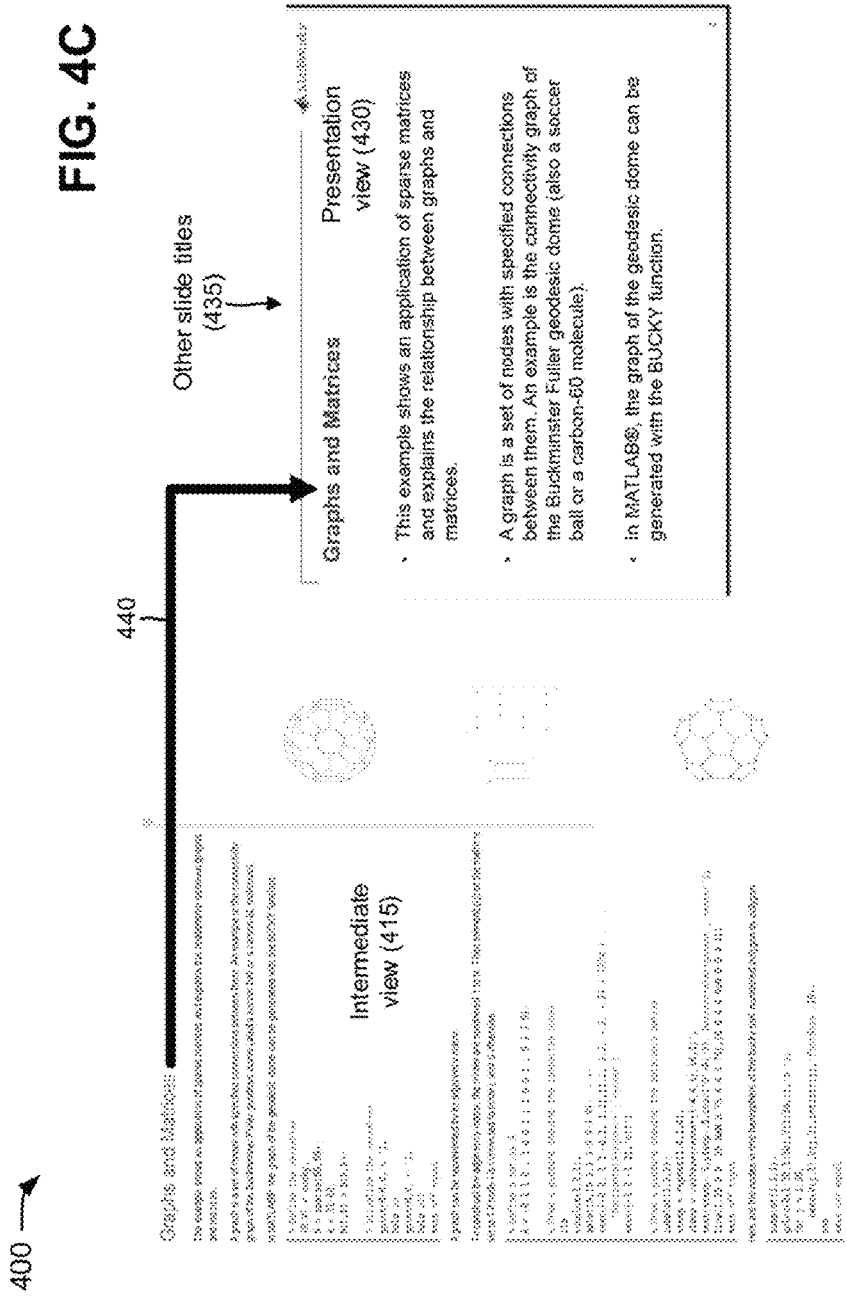

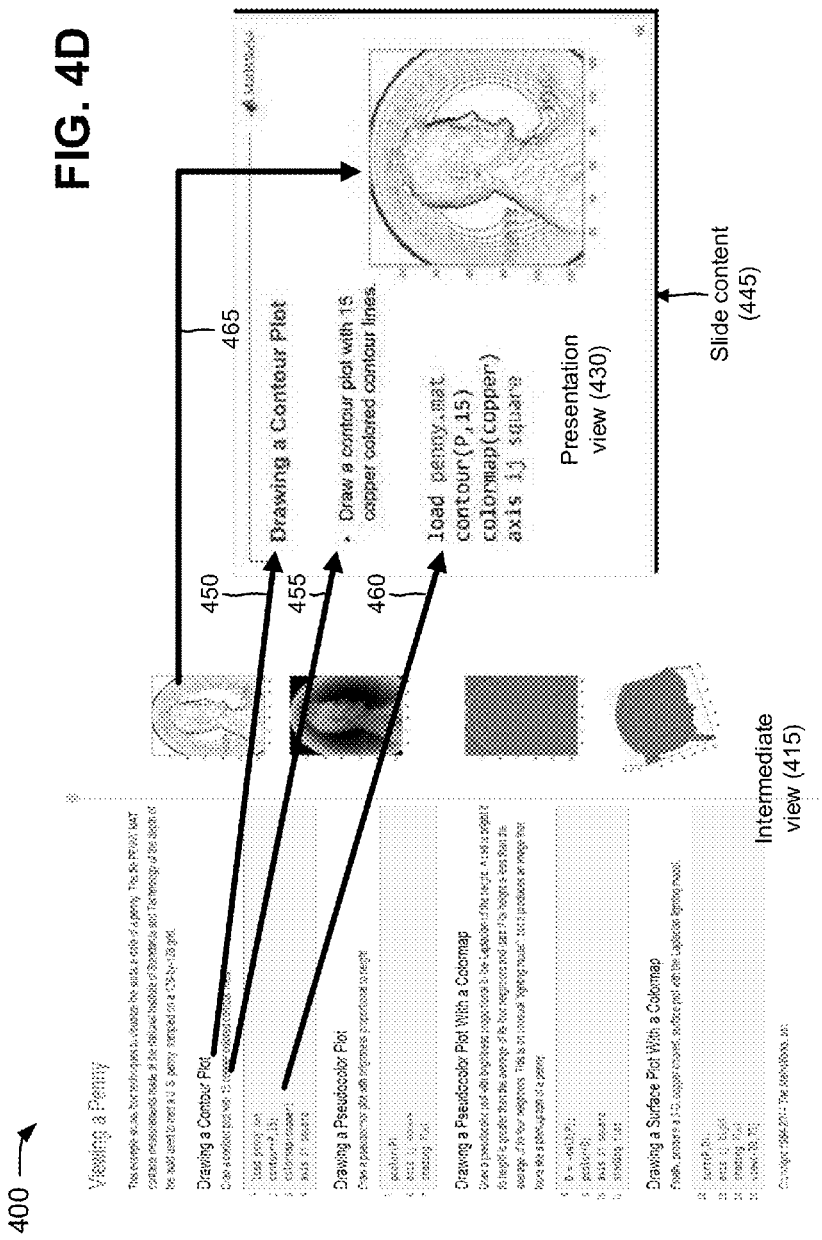

Graphs and Matrices — 525

- This example shows an application of sparse matrices and explains the relationship between graphs and matrices.

- A graph is a set of nodes with specified connections between them. An example is the connectivity graph of the Buckminster Fuller geodesic dome (also a soccer ball or a carbon-60 molecule).

- The graph of the geodesic dome can be generated with the BUCKY function.

Graphs and Matrices ← 525

- A graph can be represented by its adjacency matrix
- To construct the adjacency matrix, the nodes are numbered 1 to N. Then element (i,j) of the matrix is set to 1 if node i is connected to node j, and 0 otherwise.

} 540

```
% Define a matrix A.
A = [0 1 1 0; 1 0 0 1; 1 0 0 1; 0 1 1 0];

% Draw a picture showing the connected nodes.
cla
subplot(1,2,1);
gplot(A,[0 1;1 1;0 0;1 0],'.-');
text([-0.2, 1.2 -0.2, 1.2],[1.2, 1.2, -.2, -.2],('1234')', ...
    'HorizontalAlignment','center')
axis([-1 2 -1 2],'off')
```

} 545

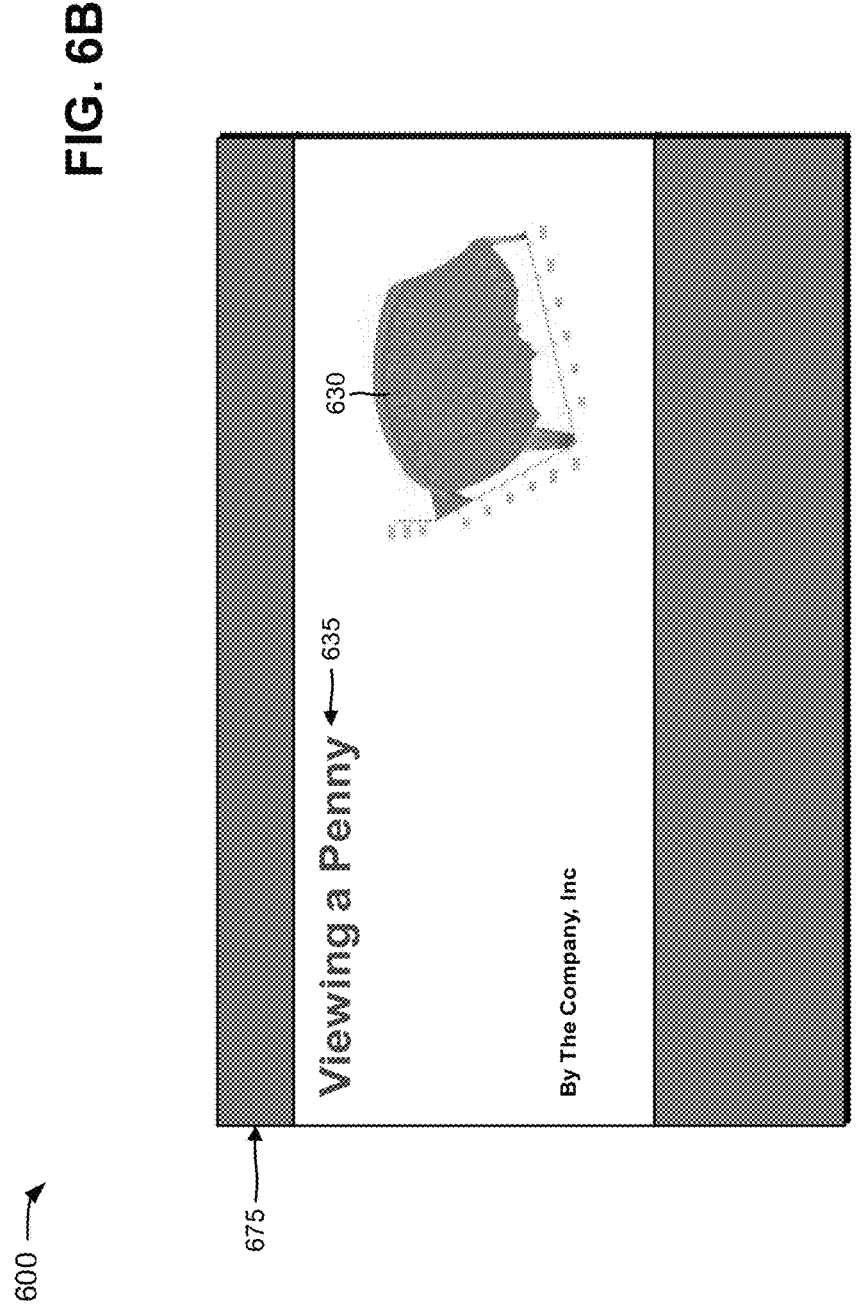

FIG. 6C

Viewing a Penny —— 635

This example shows four techniques to visualize the surface data of a penny. The file PENNY.MAT contains measurements made at the National Institute of Standards and Technology of the depth of the mold used to mint a U. S. penny, sampled on a 128-by-128 grid.

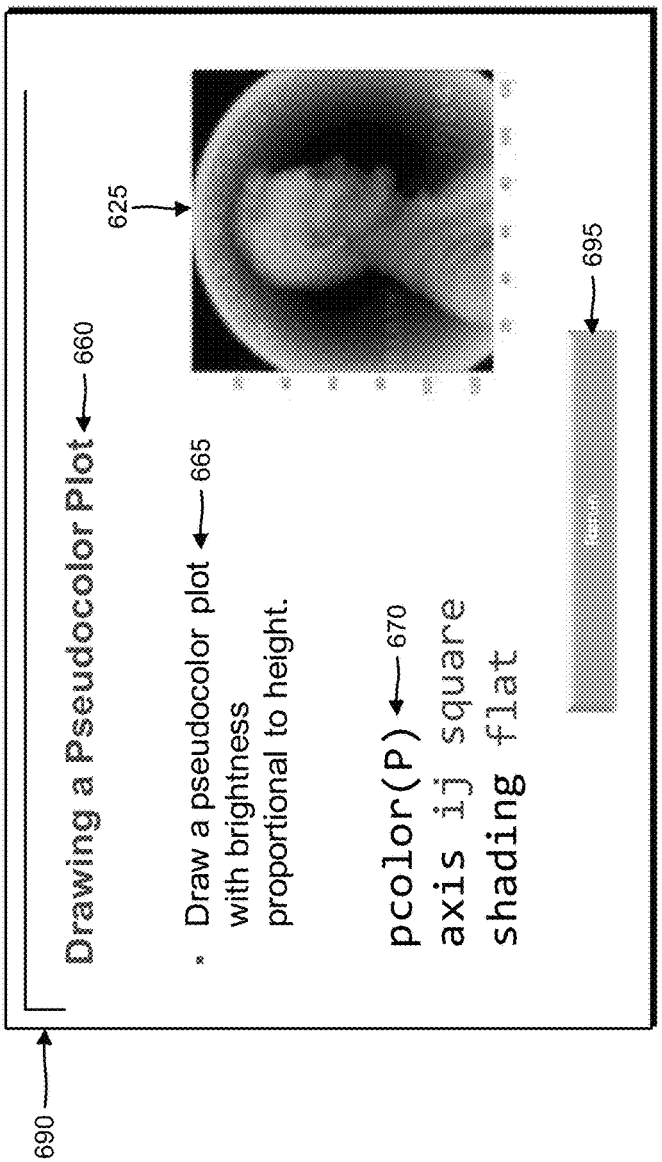

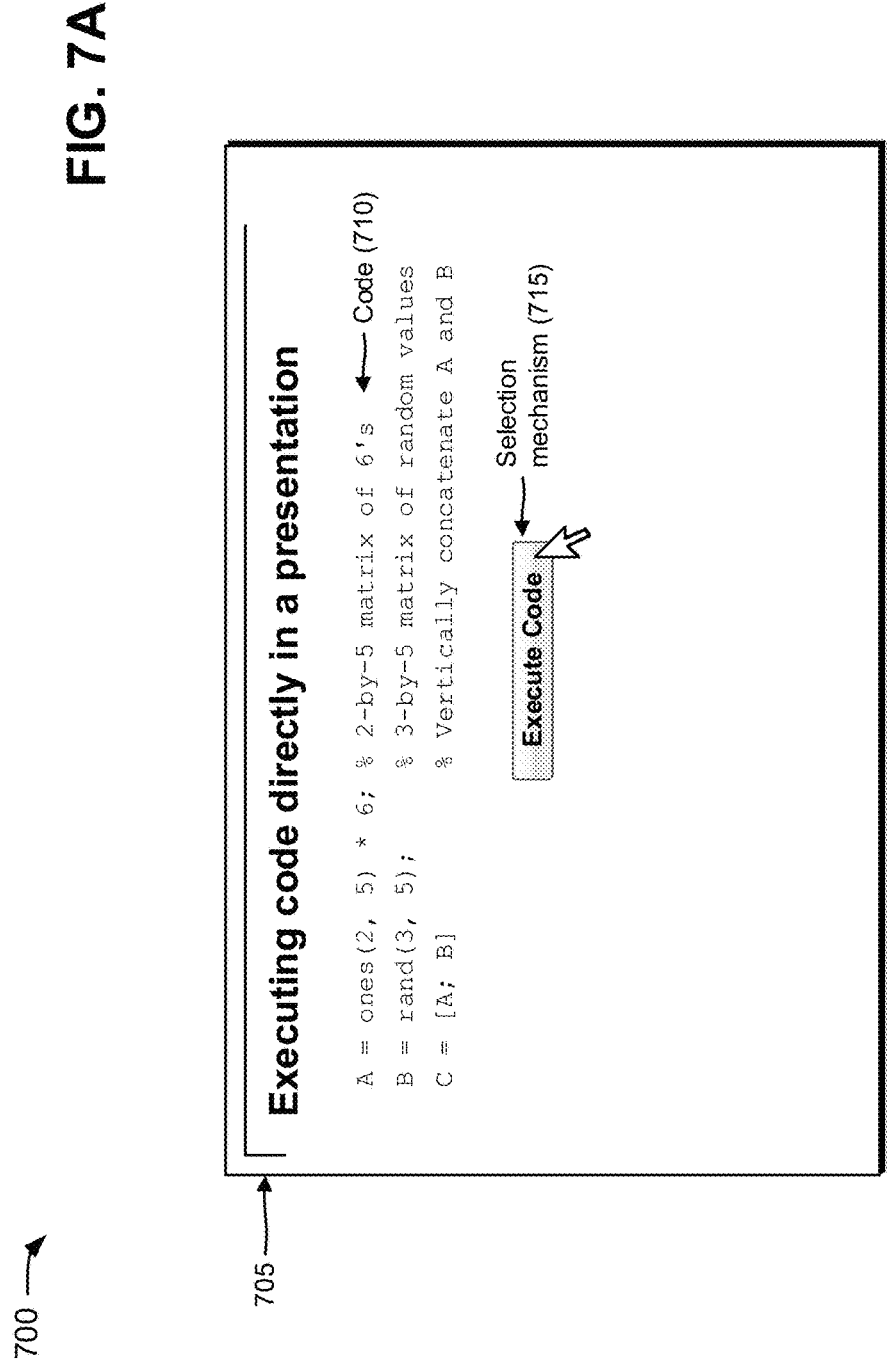

Executing code directly in a presentation

A = ones(2, 5) * 6;    % 2-by-5 matrix of 6's  ← Execute (725)
B = rand(3, 5);        % 3-by-5 matrix of random values
C = [A; B]             % Vertically concatenate A and B A =   6.0000   6.0000   6.0000   6.0000   6.0000
      6.0000   6.0000   6.0000   6.0000   6.0000

↑ Result (730)

FIG. 7C

Executing code directly in a presentation

```
A = ones(2, 5) * 6;    % 2-by-5 matrix of 6's      ← Execute (740)
B = rand(3, 5);        % 3-by-5 matrix of random values
C = [A; B]             % Vertically concatenate A and B B =
    0.9501    0.4860    0.4565    0.4447    0.9218
    0.2311    0.8913    0.0185    0.6154    0.7382
    0.6068    0.7621    0.8214    0.7919    0.1763
```
                                    ← Result (745)

FIG. 7D

Executing code directly in a presentation

```
A = ones(2, 5) * 6;   % 2-by-5 matrix of 6's
B = rand(3, 5);       % 3-by-5 matrix of random values
C = [A; B]            % Vertically concatenate A and B
```
← Execute (755)

```
C =
    6.0000    6.0000    6.0000    6.0000    6.0000
    6.0000    6.0000    6.0000    6.0000    6.0000
    0.9501    0.4860    0.4565    0.4447    0.9218
    0.2311    0.8913    0.0185    0.6154    0.7382
    0.6068    0.7621    0.8214    0.7919    0.1763
```
← Result (760)

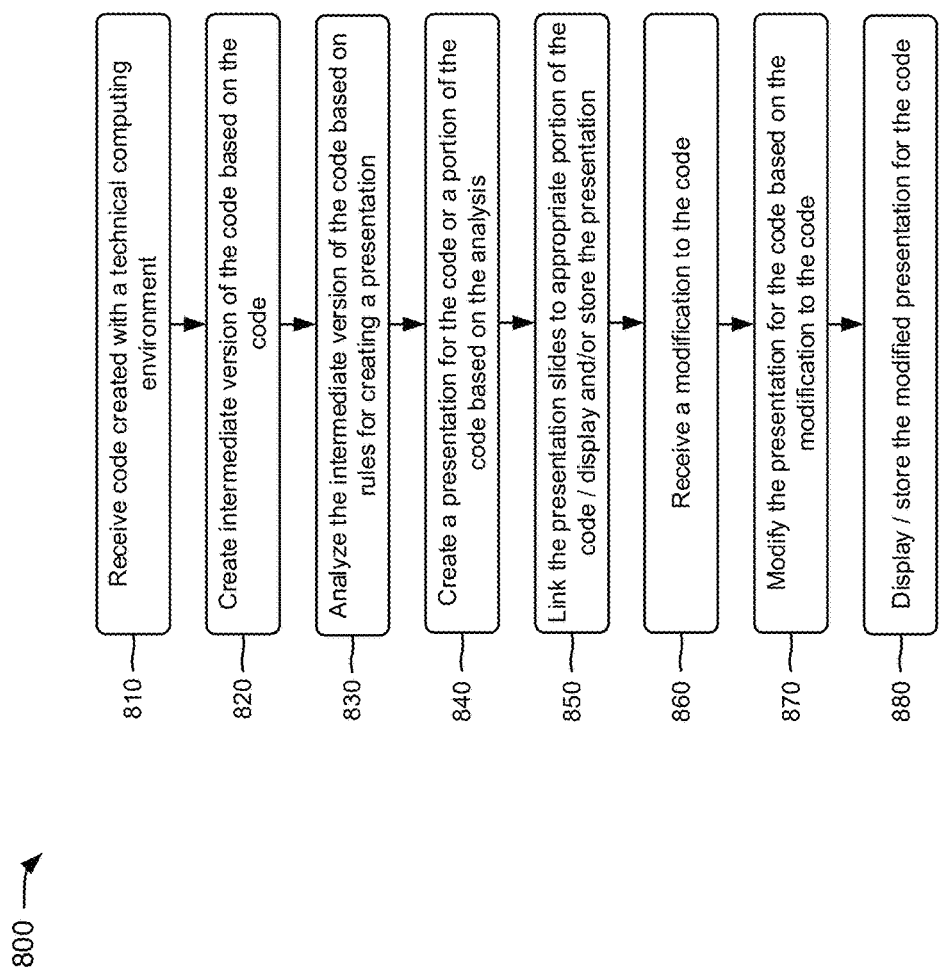

AUTOMATIC GENERATION OF A PRESENTATION FROM CODE BASED ON ANALYSIS OF AN INTERMEDIATE VERSION OF THE CODE

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 3 is a diagram of example components of one or more devices of FIG. 2;

FIGS. 4A-4E are diagrams of an example implementation for automatically creating a presentation based on code;

FIGS. 5A-5F are diagrams of another example implementation for automatically creating a presentation based on code;

FIGS. 6A-6E are diagrams of still another example implementation for automatically creating a presentation based on code;

FIGS. 7A-7D are diagrams of an example implementation for executing code directly in a presentation; and FIG. 8 is a flow chart of an example process for automatically generating a presentation from code.

DETAILED DESCRIPTION

The following detailed description of example implementations refers to the accompanying drawings. The same reference numbers in different drawings may identify the same or similar elements.

A device, such as a computer, may be used to receive or create code (e.g., programming code, raw code, or the like). The code may be used to perform tasks related to aforementioned disciplines. In some instances, a developer of the code may be required to present features of the code to an audience of one or more people. In one example, the developer may utilize the device to display the code to the audience and/or to execute the code for the audience. In such an example, however, it may be challenging for the audience to read and understand complicated syntax of the code, and to keep the audience focused on the features of the code. In another example, the developer may utilize the device to insert portions of the code within a presentation (e.g., via presentation software). The presentation may keep the audience focused, and may be easier to read and understand than the displayed code. However, it is a tedious and time consuming process to insert portions of the code within the presentation.

Systems and/or methods, described herein, may automatically generate a presentation based on code, and may enable the code to be executed and/or modified via the presentation. The systems and/or methods may utilize the code structure, annotations for the code, and/or other information associated with the code to automatically create the presentation. The systems and/or methods may determine (e.g., based on the code) slide titles, bullets, animation, how to partition the code, or the like for the presentation. The presentation may be utilized for performing a code review or for presenting to an audience of people.

Figure 1A:
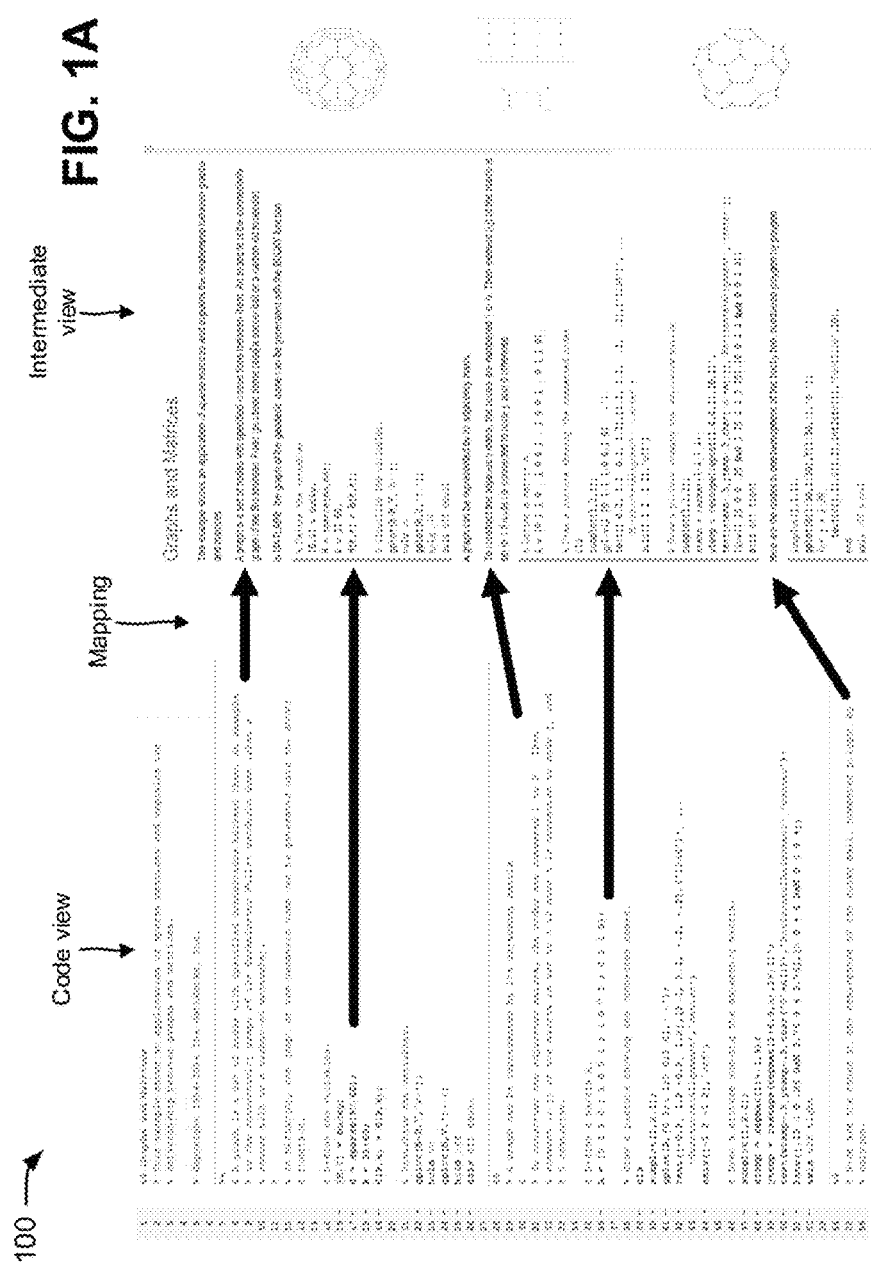
Figure 1B:
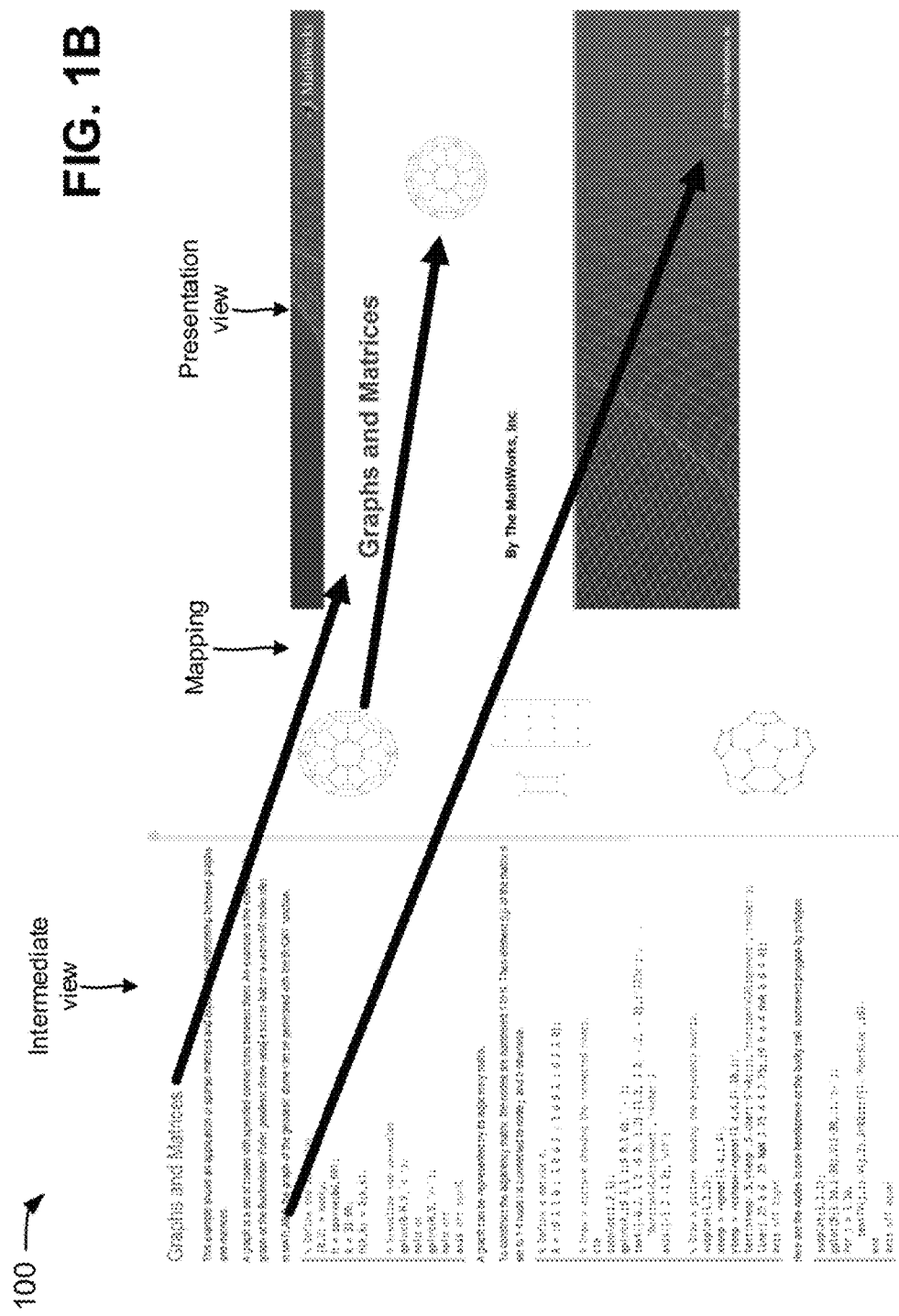

FIGS. 1A and 1B are diagrams of an overview of an example implementation 100 described herein. Example implementation 100 may be performed by a device, such as a computer.

With reference to FIG. 1A, the device may receive code or may create the code, and may display the code in a code view. The code may map to visual elements (e.g., titles, headers, text, code sections, or the like). In some implementations, the device may utilize the mapping to the visual elements to automatically create an intermediate version of the code, and may display the intermediate version of the code in an intermediate code view, as further shown in FIG. 1A. In such implementations, the device may establish links between portions of the code (e.g., the visual elements), and may utilize the links to facilitate other uses of the code in the intermediate code view or the presentation view (shown in FIG. 1B). The intermediate code view and/or the presentation view may include a formatted document that includes the visual elements of the code, artifacts associated with execution of the code (or code sections), as well as artifacts associated with creating the intermediate code view. The code may be converted into the formatted document so that the formatted document may be shared with others for teaching or demonstration, to generate readable, external documentation of the code, or the like.

In some implementations, the device may analyze the intermediate version of the code based on rules for creating a presentation, and may automatically create a presentation for the code, or a portion of the code, based on the analysis of the intermediate version of the code. As shown in FIG. 1B, the device may display the presentation in a presentation view. The code and/or the intermediate version of the code may map to visual elements (e.g., titles, headers, text, code sections, or the like). In some implementations, the device may utilize the mapping to the visual elements to automatically create the presentation for the code, and may display the presentation for the code in the presentation view. In such implementations, the device may establish links between the visual elements, and may utilize the links to facilitate other uses of the code in the presentation view. As further shown in FIG. 1B, a title (e.g., "Graphs and Matrices") of the intermediate version of the code may be mapped to and utilized as a title for a slide of the presentation. An image (e.g., a geodesic dome) output by the code may be mapped to and utilized as an image for the slide of the presentation, and copyright information (e.g., "©2015 The MathWorks, Inc.") may be generated in the slide of the presentation.

In some implementations, the device may automatically create the presentation for the code directly from the code and/or directly from the intermediate version of the code. In some implementations, the device may automatically create the intermediate version of the code directly from the code. In some implementations, the device may automatically create the intermediate version of the code based on the code, and then may automatically create the presentation for the code based on the intermediate version of the code. In some implementations, the device may automatically create the code from the intermediate version of the code, may automatically create the code from the presentation for the code, may automatically create the intermediate version of the code from the presentation for the code, or the like. In some implementations, the device may automatically create a published version of the code directly from the code and/or directly from the intermediate version of the code.

In some implementations, the device may receive a modification to the code via the code view, the intermediate view, and/or the presentation view, and may update the other views based on the received modification. For example, the device may modify the presentation for the code based on the modification to the code, and may display the modified presentation for the code in the presentation view. In this way, the content of the code view, the intermediate view, and the presentation view may be linked.

Systems and/or methods, described herein, may automatically generate a presentation based on code, and may enable the code to be executed and/or modified via the presentation. The systems and/or methods may reduce the time and effort required to generate a presentation based on code, and may provide a presentation about the code that is easy to read and understand. Enabling a portion of the code to be executed and/or modified via the presentation may aid in code development because it may allow a developer to focus on a small targeted portion of the code at a time.

FIG. 2 is a diagram of an example environment 200 in which systems and/or methods, described herein, may be implemented. As shown in FIG. 2, environment 200 may include a client device 210, which may include a TCE 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing information, such as information associated with code. For example, client device 210 may include a computing device, such as a desktop computer, a laptop computer, a tablet computer, a handheld computer, a server, a mobile phone (e.g., a smart phone, a radiotelephone, or the like), or a similar device. In some implementations, client device 210 may receive information from and/or provide information to server device 230.

Client device 210 may host TCE 220. Functions described herein as being performed by TCE 220 may be performed by client device 210 and execution of TCE 220 by client device 210. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB™ software; OCTAVE™; PYTHON™; COMSOL™ Script; MATRIXx™ from NATIONAL INSTRUMENTS™; MATHEMATICA™ from WOLFRAM RESEARCH, INC.™; MATHCAD™ from MATHSOFT ENGINEERING & EDUCATION INC.™; MAPLE™ from MAPLESOFT™; EXTEND™ from IMAGINE THAT INC.™; SCILAB™ from THE FRENCH INSTITUTION FOR RESEARCH IN COMPUTER SCIENCE AND CONTROL (INRIA)™; VIRTUOSO™ from CADENCE™; MODELICA™ or DYMOLA™ from DYNASIM™; etc.); a graphically-based environment (e.g., SIMULINK® software, STATEFLOW® software, SIMEVENTS® software, SIMSCAPE™ software, etc., by THE MATHWORKS, Inc.™; VISSIM™ by VISUAL SOLUTIONS™; LAB VIEW® by NATIONAL INSTRUMENTS™; DYMOLA™ by DYNASIM™; SOFTWIRE™ by MEASUREMENT COMPUTING™; WIT™ by DALSA CORECO™; VEE PRO™ or SYSTEMVUE™ by AGILENT™; VISION PROGRAM MANAGER™ from PPT VISION™; KHOROS™ from KHORAL RESEARCH™; GEDAE™ by GEDAE, Inc.™; SCICOS™ from (INRIA)™; VIRTUOSO™ from CADENCE™; RATIONAL ROSE™ from IBM™; RHAPSODY™ or TAU™ from TELELOGIC™; PTOLEMY™ from the UNIVERSITY OF CALIFORNIA AT BERKELEY™; aspects of a Unified Modeling Language (UML) or SysML environment; etc.); or another type of environment, such as a hybrid environment that includes one or more of the above-referenced text-based environments and one or more of the above-referenced graphically-based environments.

For example, TCE 220 may provide mathematical functions and/or graphical tools (e.g., for creating plots, surfaces, images, volumetric representations, or the like). In some implementations, TCE 220 may provide these functions and/or tools using toolboxes (e.g., toolboxes for signal processing, image processing, data plotting, parallel processing, or the like). In some implementations, TCE 220 may provide these functions as block sets or in another way, such as via a library, a local or remote database (e.g., a database operating in a computing cloud), remote procedure calls ("RPCs"), an application programming interface ("API"), or the like.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, discrete events, discrete states, or the like). Execution of a model to simulate a system may also be referred to as simulating a model. The model may further include static relations (e.g., algebraic relations, stochastic relations, inequalities, or the like).

Server device 230 may include one or more devices capable of receiving, generating, storing, processing, and/or providing information, such as information associated with code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute code (e.g., serially or in parallel), and may provide respective results of executing the code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), or the like), a microprocessor, and/or any processing component (e.g., a field-programmable gate array (FPGA), an application-specific integrated circuit (ASIC), or the like) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4E are diagrams of an example implementation 400 for automatically creating a presentation based on code. The operations described in connection with FIGS. 4A-4E are described as being performed by client device 210. In some implementations, the operations described in connection with FIGS. 4A-4E may be performed by another device or a group of devices separate from or including client device 210, such as server device 230.

Assume that client device 210 receives code from a storage device (e.g., memory 330 and/or storage component 340, FIG. 3). In some implementations, the code may be stored in a data structure associated with client device 210, and client device 210 may receive the code by accessing the data structure. Further, assume that client device 210 utilizes TCE 220 to display the code in a code view 410, as shown in FIG. 4A. In example implementation 400, assume that the code relates to a relationship between graphs and matrices.

Client device 210 may convert the code displayed in code view 410 into an intermediate version of the code, and may display the intermediate version of the code in an intermediate code view 415, as further shown in FIG. 4A. In some implementations, client device 210 may evaluate the code such that the evaluation may encompass multiple commands for generating intermediate code view 415, where the commands may partition a multi-line statement and/or may be evaluated in a distinct workspace. Client device 210 may utilize the code, and data resulting from the evaluation of the code, as a basis of a document object model. The document object model may represent information in a tree structure and may allow access to information represented by the document object model using particular languages (e.g., languages with object oriented features, such as JavaScript). The tree structure may enable traversing back and forth between the document object model and the code and/or data resulting from the evaluation of the code. In some implementations, a Simple API for XML (SAX) may be used in place of the document object model.

In some implementations, a user of client device 210 may select a desired format for the intermediate version of the code. For example, the user may choose to convert the code and data resulting from the code into an HTML document, an XML document, a LaTeX document, a PDF document, or the like. Client device 210 may utilize templates (e.g., XSL templates) to transform the document object model into the user-selected format. The templates may provide general forms that are applied to the document object model so that the intermediate version of the code adheres to the user-selected format.

The intermediate version of the code may include a document that includes visual elements of the code, portions of the code, comments in the code, output of the code (e.g., an image 420, such as a geodesic dome), or the like. In some implementations, the code may include characters or symbols (e.g., associated with text) indicating that the text represents comments in the code. In some implementations, client device 210 may execute the code to generate outputs of the code, which may be used in the intermediate version of the code. In some implementations, client device 210 may mark each section of the intermediate version of the code as code, comments, output, or the like.

In some implementations, client device 210 may display a menu that provides an item for creating the intermediate version of the code, an item for creating a presentation based on the code, or the like. Assume that client device 210 receives a selection of a menu item for creating a presentation based on the code. In some implementations, client device 210, based on the selection, may display options for creating the presentation (e.g., based on all of the code, a selected portion of the code, selected portions of the code, or the like). If client device 210 receives a selection of an option for creating the presentation, client device 210 may display options for output formats of the presentation (e.g., PowerPoint®, CustomShow, Prezi®, SlideShark™, or the like). Further, assume that client device 210 receives a selection of an output format.

Client device 210 may analyze the intermediate version of the code based on one or more rules for creating a presentation, and may automatically create a title slide of a presentation for the code (or a portion of the code), based on the analysis of the intermediate version of the code. As shown in FIG. 4B, client device 210 may display the title slide of the presentation in a presentation view 430. In some implementations, the presentation may be exported or converted into a format compatible with presentation software, such as PowerPoint®, CustomShow, Prezi®, SlideShark™, Adobe Acrobat®, or the like. As further shown in FIG. 4B, client device 210 may display intermediate code view 415 and image 420. Client device 210 may utilize a title (e.g., "Graphs and Matrices") of the intermediate version of the code (e.g., in intermediate code view 415) as a title for the title slide of the presentation. Client device 210 may utilize image 420 as an image for the title slide of the presentation, and may generate copyright information (e.g., "©2015 The MathWorks, Inc.") in the title slide of the presentation based on information (e.g., company information, publication information, a copyright symbol, or the like) provided in intermediate code view 415.

In some implementations, client device 210 may take dynamic elements associated with execution of the code (e.g., transitions that a figure goes through during a loop in the code), and may create an image and/or a movie that can be embedded into the presentation. In such implementations, client device 210 may be maintain states for various stages of execution of the code, and such states may be assembled into an image, a data structure, a movie, or the like, for use in the intermediate version of the code.

In some implementations, the architecture for creating the intermediate version of the code and the presentation may include a static template and a dynamic template for outputs. The static template may controls things that do not change, such as corporate presentation styles, copyright notices, corporate names, or the like. The dynamic template may controls things that do change, such as titles, code contents, summaries, plots and other images, or the like.

As shown in FIG. 4C, client device 210 may automatically create additional slides 435 for the presentation based on the intermediate version of the code, and may display additional slides 435 in presentation view 430. Since the intermediate version of the code (e.g., in intermediate code view 415) includes a single title (e.g., "Graphs and Matrices"), and does not include sub-titles or headers, client device 210 may utilize the single title as titles for the additional slides of the presentation, as indicated by reference number 440 in FIG. 4C.

Now assume that intermediate code view 415 includes information associated with visualizing surface data of a penny, as shown in FIG. 4D. Client device 210 may automatically create slide content 445 for a presentation based on the intermediate version of the code (e.g., in intermediate code view 415), and may display the slide in presentation view 430. Client device 210 may utilize a header (e.g., "Drawing a Contour Plot") of the intermediate version of the code (e.g., in intermediate code view 415) as a title for the slide of the presentation, as indicated by reference number 450 in FIG. 4D. Client device 210 may display text (e.g., "Draw a contour plot with 15 copper colored contour lines") of the intermediate version of the code in the slide of the presentation, as indicated by reference number 455 in FIG. 4D. Client device 210 may display actual code (e.g., "load penny.mat . . . ") of the intermediate version of the code in the slide of the presentation, as indicated by reference number 460 in FIG. 4D. Client device 210 may display an output (e.g., an image of a penny) generated by the actual code (e.g., "load penny.mat . . . ") in the slide of the presentation, as indicated by reference number 465 in FIG. 4D. In this way, portions of the intermediate version of the code can be linked to a particular slide of the presentation.

Figure 4E:
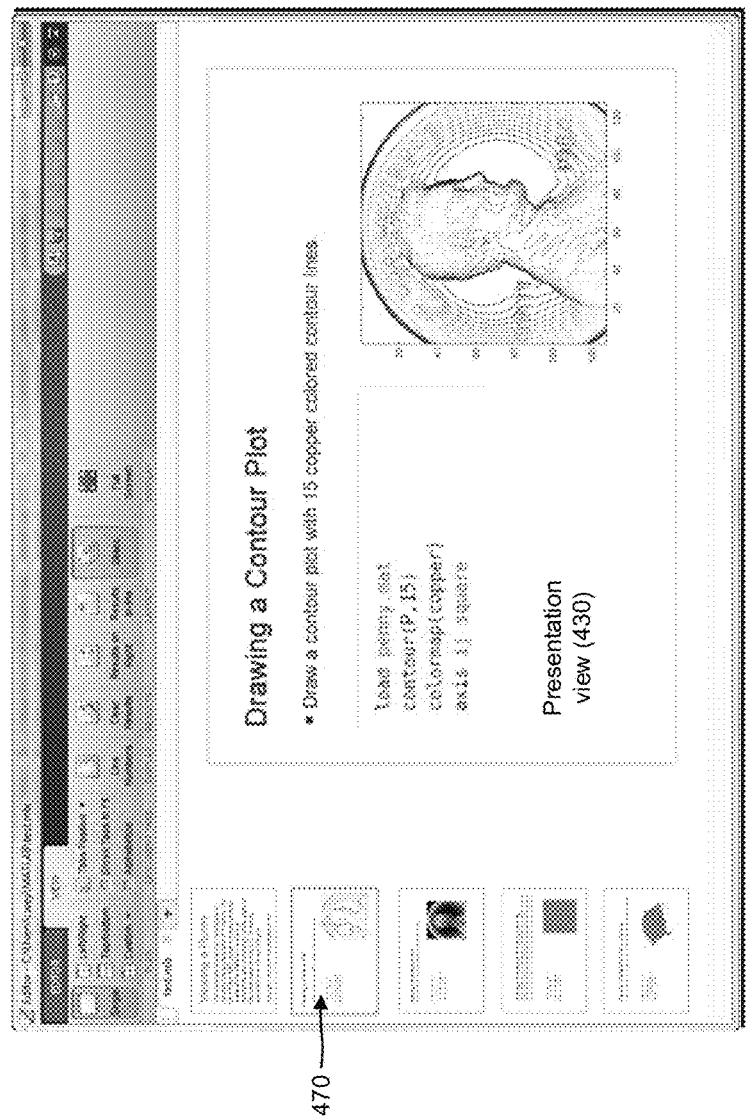

As shown in FIG. 4E, the presentation generated by client device 210 may be displayed in a presentation window 470. Presentation window 470 may include thumbnails of the slides of the presentation and a larger size version of a slide selected from the thumbnails. Presentation window 470 may include a presentation mode option that, when selected, causes client device 210 to display the presentation in a full screen mode. In some implementations, code displayed in the presentation of presentation window 470 may be executed by client device 210, and may be edited via presentation window 470 and/or code view 410 (e.g., shown in FIG. 4A).

As indicated above, FIGS. 4A-4E are provided merely as an example. Other examples are possible and may differ from what was described with regard to FIGS. 4A-4E.

FIGS. 5A-5F are diagrams of another example implementation 500 for automatically creating a presentation based on code. The operations described in connection with FIGS. 5A-5F are described as being performed by client device 210. In some implementations, the operations described in connection with FIGS. 5A-5F may be performed by another device or a group of devices separate from or including client device 210, such as server device 230.

Figure 5A:
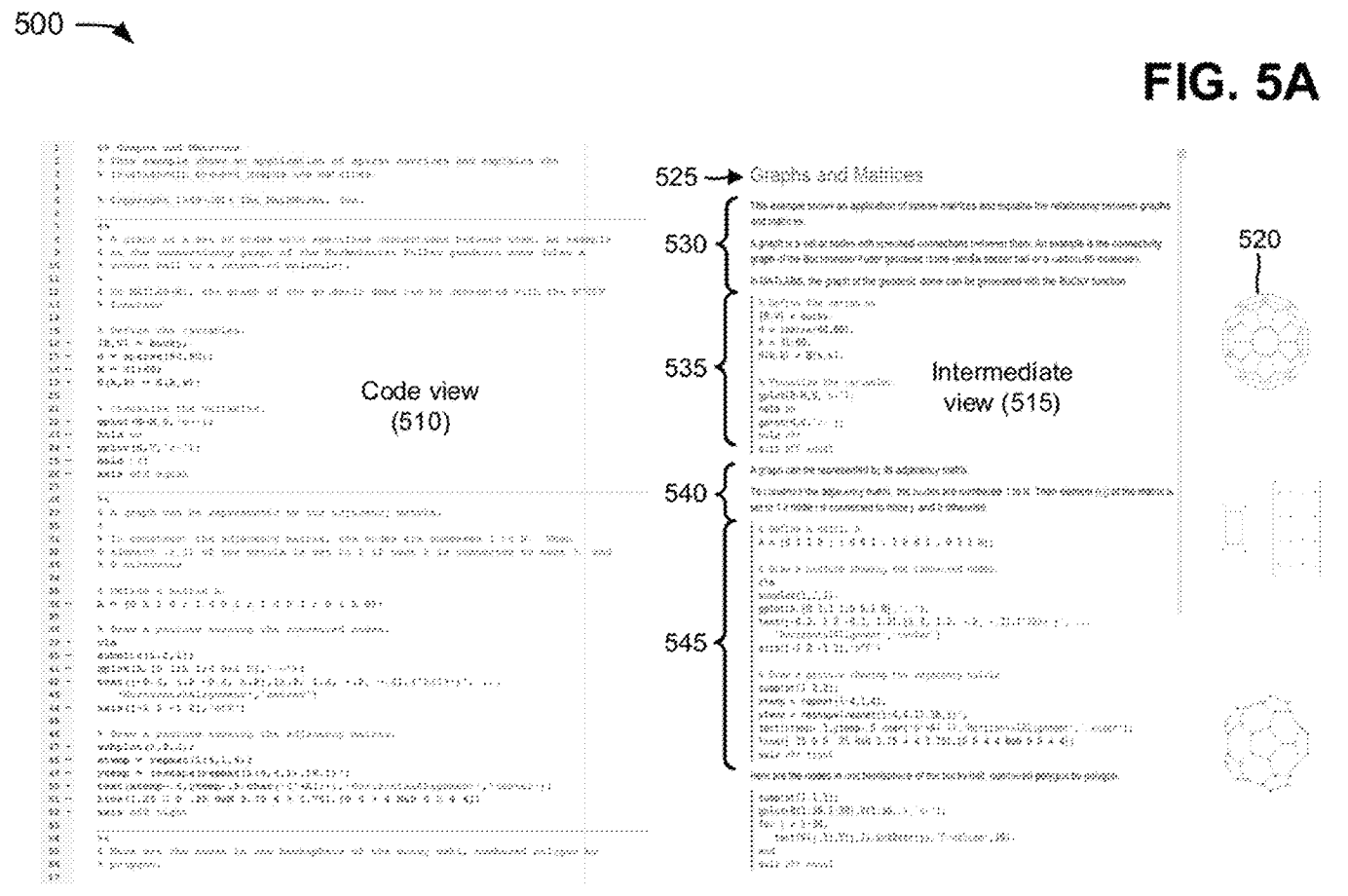

Assume that client device 210 receives code from a storage device (e.g., memory 330 and/or storage component 340, FIG. 3). In some implementations, the code may be stored in a data structure associated with client device 210, and client device 210 may receive the code by accessing the data structure. Further, assume that client device 210 utilizes TCE 220 to display the code, as shown in FIG. 5A. In example implementation 500, assume that the code relates to a relationship between graphs and matrices, and that the code is displayed in a code view 510.

Client device 210 may convert the code displayed in code view 510 into an intermediate version of the code, and may display the intermediate version of the code in an intermediate code view 515, as further shown in FIG. 5A. The intermediate version of the code may include a document that includes the code, comments in the code, output of the code (e.g., an image 520, such as a geodesic dome), or the like. For example, the intermediate version of the code may include a title 525 (e.g., "Graphs and Matrices"), a first description section 530 (e.g., "This example shows an application of sparse matrices . . . "), a first code section 535 (e.g., "% Define the variables . . . "), a second description section 540 (e.g., "A graph can be represented by . . . "), a second code section 545 (e.g., "% Define a matrix A . . . "), or the like.

Client device 210 may analyze the intermediate version of the code (e.g., provided in intermediate code view 515) based on rules for creating a presentation, and may automatically create a presentation for the code (or a portion of the code), based on the analysis of the intermediate version of the code. For example, client device 210 may create a presentation that includes the slides depicted in FIGS. 5B-5F.

Figure 5B:
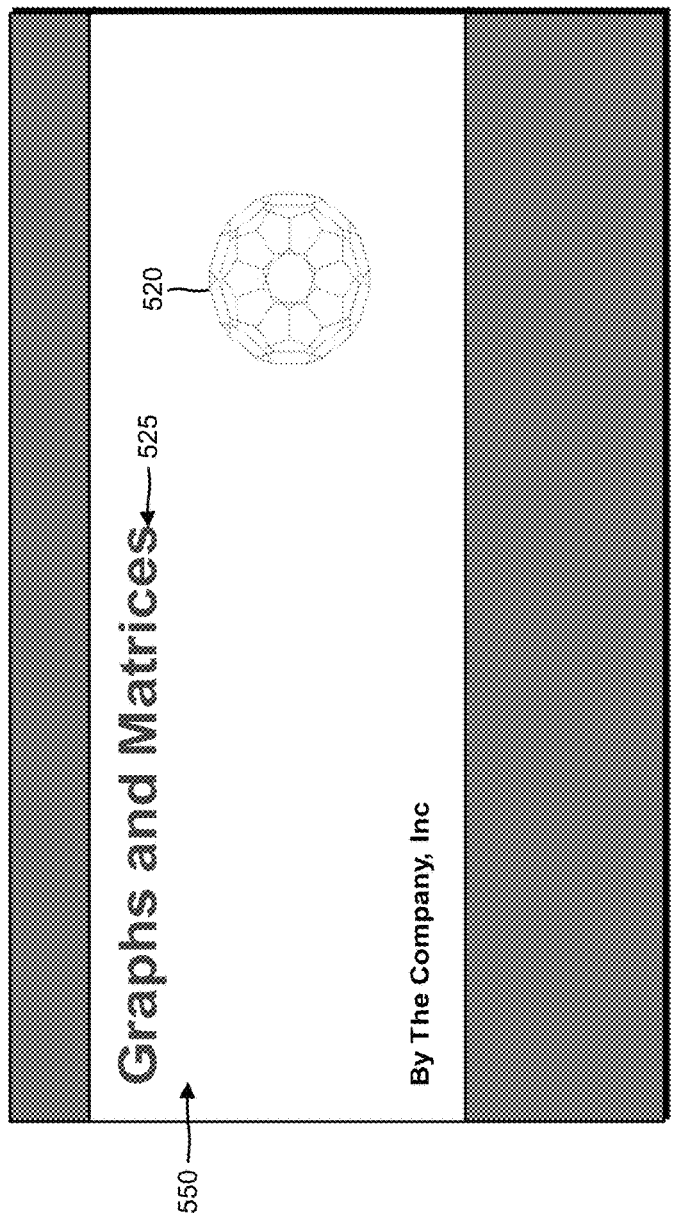

As shown in FIG. 5B, client device 210 may create a title slide 550 of the presentation, and may display title slide 550 of the presentation. As further shown in FIG. 5B, client device 210 may utilize title 525 (e.g., "Graphs and Matrices") of the intermediate version of the code (e.g., in intermediate code view 515) as a title for title slide 550. Client device 210 may utilize image 520 as an image for title slide 550 of the presentation, and may provide other information (e.g., "By The Company, Inc.") in title slide 550 of the presentation based on information (e.g., company information, publication information, a copyright symbol, or the like) provided in intermediate code view 515.

As shown in FIG. 5C, client device 210 may create a first slide 555 of the presentation, and may display first slide of the presentation. As further shown in FIG. 5C, client device 210 may utilize title 525 (e.g., "Graphs and Matrices") of the intermediate version of the code (e.g., in intermediate code view 515) as a title for first slide 555. Client device 210 may utilize first description section 530 (e.g., "This example shows an application of sparse matrices . . . ") of the intermediate version of the code (e.g., in intermediate code view 515) as text for first slide 555. Client device 210 may provide paragraphs of first description section 530 as bullets in first slide 555, and may automatically size the text and/or space the bullets to fit first slide 555, based on a number of words and/or paragraphs in first description section 530.

Figure 5D:
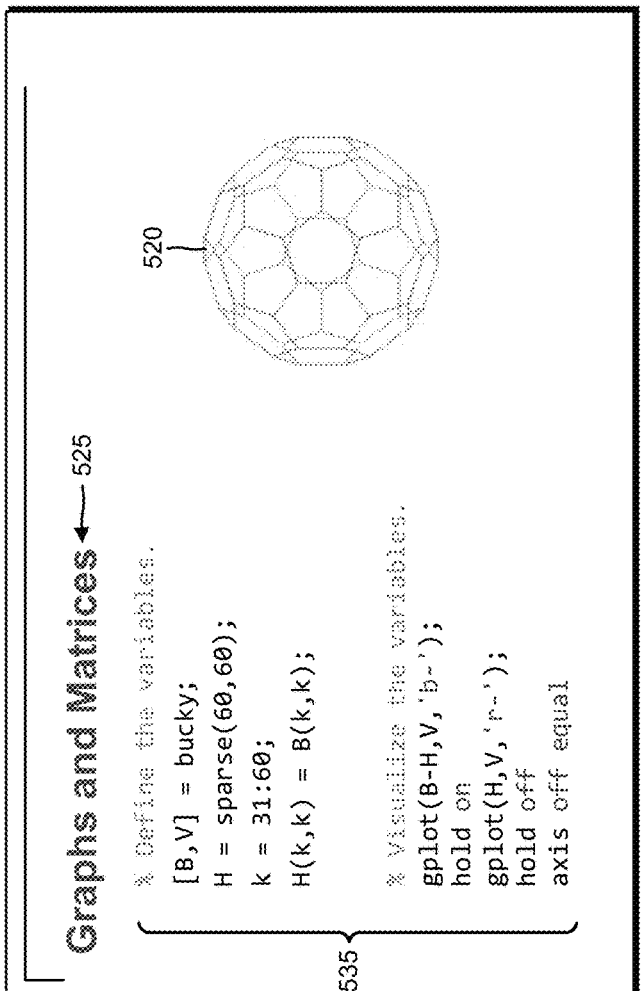

As shown in FIG. 5D, client device 210 may create a second slide 560 of the presentation, and may display second slide 560 of the presentation. As further shown in FIG. 5D, client device 210 may utilize title 525 (e.g., "Graphs and Matrices") of the intermediate version of the code (e.g., in intermediate code view 515) as a title for second slide 560.

Client device 210 may utilize first code section 535 (e.g., "% Define the variables . . . ") of the intermediate version of the code (e.g., in intermediate code view 515) as text for second slide 560. Client device 210 may separate blocks of code of first code section 535 with whitespace in second slide 560, and may provide outputs of first code section 535 (e.g., image 520) in second slide 560.

As shown in FIG. 5E, client device 210 may create a third slide 565 of the presentation, and may display third slide 565 of the presentation. As further shown in FIG. 5E, client device 210 may utilize title 525 (e.g., "Graphs and Matrices") of the intermediate version of the code (e.g., in intermediate code view 515) as a title for third slide 565. Client device 210 may utilize second description section 540 (e.g., "A graph can be represented by . . . ") of the intermediate version of the code (e.g., in intermediate code view 515) as text for third slide 565. Client device 210 may provide paragraphs of second description section 540 as bullets in third slide 565, and may automatically size the text and/or space the bullets to fit third slide 565, based on a number of words and/or paragraphs in second description section 540. As further shown in FIG. 5E, client device 210 may utilize second code section 545 (e.g., "% Define a matrix A . . . ") of the intermediate version of the code (e.g., in intermediate code view 515) as additional text for third slide 565. Client device 210 may separate blocks of code of second code section 545 with whitespace in third slide 565.

Figure 5F:
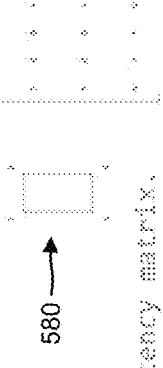

As shown in FIG. 5F, client device 210 may create a fourth slide 570 of the presentation, and may display fourth slide 570 of the presentation. As further shown in FIG. 5F, client device 210 may utilize title 525 (e.g., "Graphs and Matrices") of the intermediate version of the code (e.g., in intermediate code view 515) as a title for fourth slide 570. Client device 210 may utilize a code section 575 (e.g., "% Draw a picture showing the adjacency matrix . . . ") of the intermediate version of the code as text for fourth slide 570. Client device 210 may provide, in fourth slide 570, outputs of code section 575 (e.g., an adjacency matrix 580) to the right of code section 575, to the left of code section 575, above code section 575, or below code section 575 (e.g., depending on the size of code section 575).

As indicated above, FIGS. 5A-5F are provided merely as an example. Other examples are possible and may differ from what was described with regard to FIGS. 5A-5F.

FIGS. 6A-6E are diagrams of still another example implementation 600 for automatically creating a presentation based on code. The operations described in connection with FIGS. 6A-6E are described as being performed by client device 210. In some implementations, the operations described in connection with FIGS. 6A-6E may be performed by another device or a group of devices separate from or including client device 210, such as server device 230.

Figure 6A:
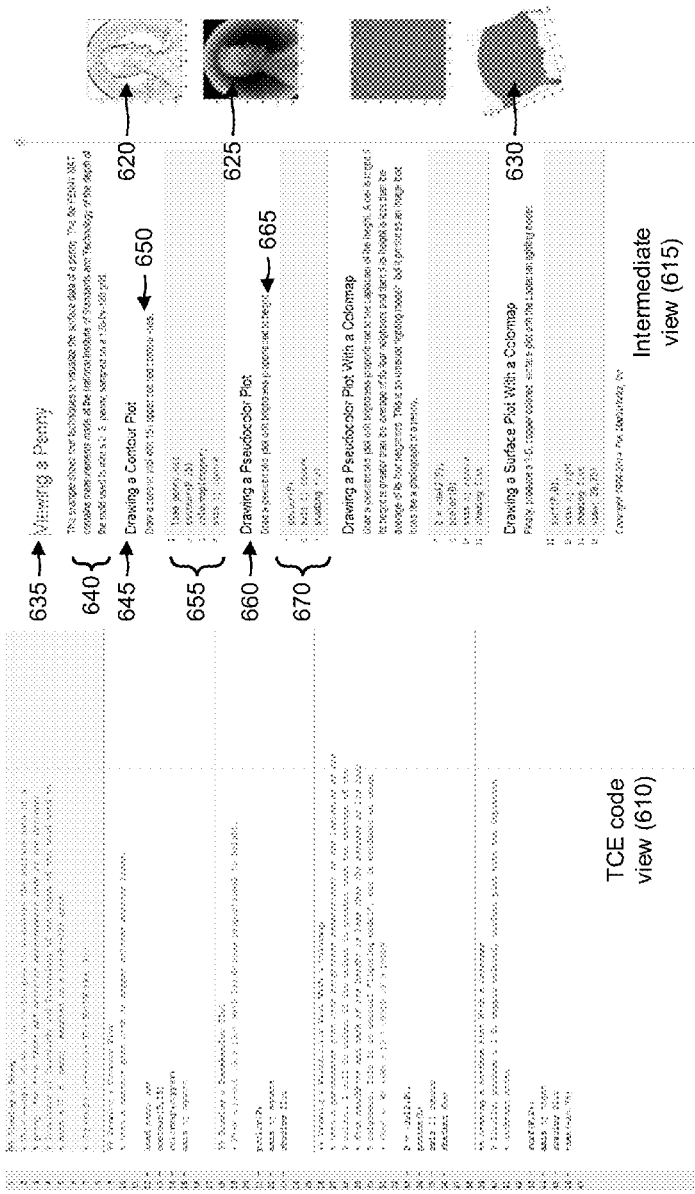

Assume that client device 210 receives code from a storage device (e.g., memory 330 and/or storage component 340, FIG. 3). In some implementations, the code may be stored in a data structure associated with client device 210, and client device 210 may receive the code by accessing the data structure. Further, assume that client device 210 utilizes TCE 220 to display the code, as shown in FIG. 6A. In example implementation 600, assume that the code relates to techniques to visualize surface data of a penny, and that the code is displayed in a code view 610.

Client device 210 may convert the code displayed in code view 610 into an intermediate version of the code, and may display the intermediate version of the code in an intermediate code view 615, as further shown in FIG. 6A. The intermediate version of the code may include a document that includes the code, comments in the code, output of the code (e.g., a contour plot 620, a pseudocolor plot 625, and a surface plot 630), or the like. For example, the intermediate version of the code may include a title 635 (e.g., "Viewing a Penny"), a main description section 640 (e.g., "This example shows four techniques . . . "), a first header 645 (e.g., "Drawing a Contour Plot"), a first description section 650 (e.g., "Draw a contour plot . . . "), a first code section 655 (e.g., "load penny.mat . . . "), a second header 660 (e.g., "Drawing a Pseudocolor Plot"), a second description section 665 (e.g., "Draw a pseudocolor plot . . . "), a second code section 670 (e.g., "pcolor(P) . . . "), or the like.

Client device 210 may analyze the intermediate version of the code (e.g., provided in intermediate code view 615) based on rules for creating a presentation, and may automatically create a presentation for the code (or a portion of the code), based on the analysis of the intermediate version of the code. For example, client device 210 may create a presentation that includes the slides depicted in FIGS. 6B-6E.

As shown in FIG. 6B, client device 210 may create a title slide 675 of the presentation, and may display title slide 675 of the presentation. As further shown in FIG. 6B, client device 210 may utilize title 635 (e.g., "Viewing a Penny") of the intermediate version of the code (e.g., in intermediate code view 615) as a title for title slide 675. Client device 210 may utilize surface plot 630 as an image for title slide 675 of the presentation, and may provide other information (e.g., "By The Company, Inc.") in title slide 675 of the presentation based on information (e.g., company information, publication information, a copyright symbol, or the like) provided in intermediate code view 615.

As shown in FIG. 6C, client device 210 may create a first slide 680 of the presentation, and may display first slide 680 of the presentation. As further shown in FIG. 6C, client device 210 may utilize title 635 (e.g., "Viewing a Penny") of the intermediate version of the code (e.g., in intermediate code view 615) as a title for first slide 680. Client device 210 may utilize main description section 640 (e.g., "This example shows four techniques . . . ") of the intermediate version of the code (e.g., in intermediate code view 615) as text for first slide 680. Client device 210 may automatically size and/or fit the text of main description section 640 to fit first slide 680, based on a number of words and/or paragraphs in main description section 640.

Figure 6D:
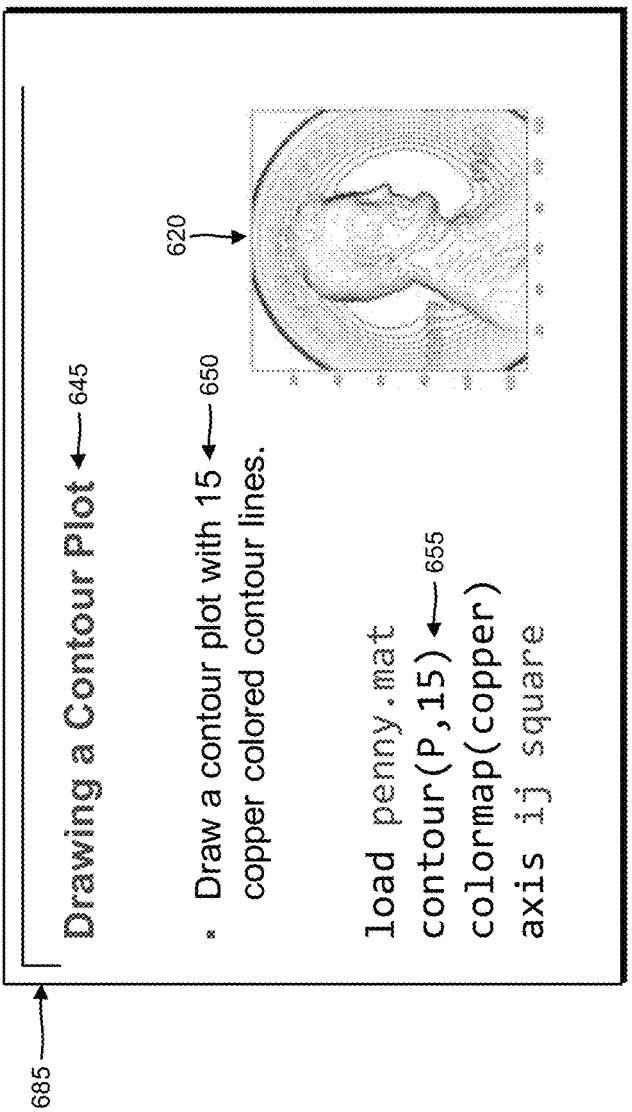

As shown in FIG. 6D, client device 210 may create a second slide 685 of the presentation, and may display second slide 685 of the presentation. As further shown in FIG. 6D, client device 210 may utilize first header 645 (e.g., "Drawing a Contour Plot") of the intermediate version of the code (e.g., in intermediate code view 615) as a title for second slide 685. Client device 210 may utilize first description section 650 (e.g., "Draw a contour plot . . . ") of the intermediate version of the code (e.g., in intermediate code view 615) as text for second slide 685. Client device 210 may automatically size and/or fit the text of first description section 650 to fit second slide 685, based on a number of words and/or paragraphs in first description section 650. As further shown in FIG. 6D, client device 210 may utilize first code section 655 (e.g., "load penny.mat . . . ") of the intermediate version of the code (e.g., in intermediate code view 615) as additional text for second slide 685. Client device 210 may provide output of first code section 655 (e.g., contour plot 620 of the penny) in second slide 685.

As shown in FIG. 6E, client device 210 may create a third slide 690 of the presentation, and may display third slide 690 of the presentation. As further shown in FIG. 6E, client device 210 may utilize second header 660 (e.g., "Drawing a Pseudocolor Plot") of the intermediate version of the code (e.g., in intermediate code view 615) as a title for third slide 690. Client device 210 may utilize second description section 665 (e.g., "Draw a pseudocolor plot . . . ") of the intermediate version of the code (e.g., in intermediate code view 615) as text for third slide 690. Client device 210 may automatically size and/or fit the text of second description section 665 to fit third slide 690, based on a number of words and/or paragraphs in second description section 665. As further shown in FIG. 6E, client device 210 may utilize second code section 670 (e.g., "pcolor(P) . . . ") of the intermediate version of the code (e.g., in intermediate code view 615) as additional text for third slide 690. Client device 210 may provide output of second code section 670 (e.g., pseudocolor plot 625 of the penny) in third slide 690. As further shown in FIG. 6E, client device 210 may provide a selection mechanism 695 (e.g., a button, a link, a menu, or the like) that, when selected, causes client device 210 to rerun or regenerate the presentation shown in FIGS. 6B-6E.

As indicated above, FIGS. 6A-6E are provided merely as an example. Other examples are possible and may differ from what was described with regard to FIGS. 6A-6E.

FIGS. 7A-7D are diagrams of an example implementation 700 for executing code directly in a presentation. The operations described in connection with FIGS. 7A-7D are described as being performed by client device 210. In some implementations, the operations described in connection with FIGS. 7A-7D may be performed by another device or a group of devices separate from or including client device 210, such as server device 230.

In example implementation 700, assume that client device 210 automatically creates a presentation, depicted in FIGS. 7A-7D, based on code received by client device 210. Further, assume that the presentation demonstrates how code may be executed directly in a presentation. As shown in FIG. 7A, assume that that client device 210 utilizes TCE 220 to display a first slide 705 of the presentation, and that first slide 705 includes code 710. In example implementation 700, assume that code 710 includes an example of vertically concatenating two matrices (e.g., matrix A and matrix B) into a third matrix (e.g., matrix C). As further shown in FIG. 7A, first slide 705 may include a selection mechanism 715 (e.g., a button, a link, a menu item, or the like) that, when selected, causes client device 210 to execute code 710.

As shown in a slide 720 of FIG. 7B, when selection mechanism 715 is selected, client device 210 may execute a first line of code 710 (e.g., A=ones(2, 5)*6), as indicated by reference number 725. Client device 210 may generate a result 730 based on the execution of the first line of code 710. Result 730 may include a two-by-five matrix (e.g., matrix A) of sixes, as further shown in FIG. 7B.

As shown in a slide 735 of FIG. 7C, client device 210 may then execute a second line of code 710 (e.g., B=rand(3, 5)), as indicated by reference number 740. Client device 210 may generate a result 745 based on the execution of the second line of code 710. Result 745 may include a three-by-five matrix (e.g., matrix B) of random values, as further shown in FIG. 7C.

As shown in a slide 750 of FIG. 7D, client device 210 may then execute a third line of code 710 (e.g., C=[A; B]), as indicated by reference number 755. Client device 210 may generate a result 760 based on the execution of the third line of code 710. Result 760 may include a five-by-five matrix (e.g., matrix C) that is a vertical concatenation of matrix A and matrix B, as further shown in FIG. 7D.

In some implementations, the operations described in connection with FIGS. 7A-7D may be executed by presentation software (e.g., PowerPoint®, CustomShow, Prezi®, SlideShark™, or the like). For example, code 710 may be executed by the presentation software while the presentation is being executed by the presentation software. In such implementations, the presentation software may interface with TCE 220 (e.g., where code 710 is executable), and TCE 220 may provide results of the execution of code 710 back to the presentation software.

In some implementations, client device 210 may create animations via the presentation software. For example, client device 210 may create animations for code 710, and code 710 may include several outputs. In such an example, the animation may display one output of code 710 at a time, as shown in FIGS. 7A-7D. In another example, client device 210 may utilize the presentation software to progressively display portions of a slide. In still another example, client device 210 may create animations for code 710, and code 710 may include a single output that changes state over time. In such an example, client device 210 may utilize the presentation software to create a movie that shows how the single output changes state over time. The movie may be broken down into frames and the frames may be tied to code 710.

As indicated above, FIGS. 7A-7D are provided merely as an example. Other examples are possible and may differ from what was described with regard to FIGS. 7A-7D.

FIG. 8 is a flow chart of an example process 800 for automatically generating a presentation from code. In some implementations, one or more process blocks of FIG. 8 may be performed by client device 210. In some implementations, one or more process blocks of FIG. 8 may be performed by another device or a group of devices separate from or including client device 210, such as server device 230.

As shown in FIG. 8, process 800 may include receiving code created with a technical computing environment (block 810). For example, client device 210 may create and/or receive code. In some implementations, client device 210 may receive the code from a storage device (e.g., memory 330 and/or storage component 340, FIG. 3). In some implementations, client device 210 (e.g., TCE 220) may receive the code based on a user creating the code. For example, a user may cause client device 210 to create or open a user interface. One or more lines of code may be added to the user interface to create the code. For example, in some implementations, client device 210 may receive a command, from the user, that indicates that a line of code is to be added to the user interface. Client device 210 may receive the command based on, for example, detecting a selection of a particular menu item, entry of a particular textual or audible input from the user, and/or entry of some other predetermined input that indicates a desire to add a line of code to the user interface.

As further shown in FIG. 8, process 800 may include creating an intermediate version of the code based on the code (block 820). For example, client device 210 may create an intermediate version of the code based on the code, comments in the code, output of the code, or the like. In some implementations, as described above in connection with FIG. 4A, client device 210 may convert the code displayed in code view 410 into an intermediate version of the code, and may display the intermediate version of the code in intermediate code view 415. The intermediate version of the code may include a document that includes the code, comments in the code, output of the code (e.g., image 420, such as a geodesic dome), or the like. The code may be converted into a formatted document so that the formatted document may be shared with others for teaching or demonstration, to generate readable, external documentation of the code, or the like. In some implementations, the code may include characters or symbols (e.g., associated with text) indicating that the text represents comments in the code. In some implementations, client device 210 may execute the code to generate outputs of the code, which may be used in the intermediate version of the code.

In some implementations, client device 210 may create the intermediate version of the code, from the code, based on rules for mapping the code to different portions of the intermediate version of the code. In some implementations, the rules for mapping the code to different portions of the intermediate version of the code may include a rule identifying a title, or a heading, in the code, and mapping the title or the heading to a title portion of the intermediate version of the code. In some implementations, the rules for mapping the code to different portions of the intermediate version of the code may include a rule identifying copyright information (if present) in the code, and mapping the copyright information to a copyright portion of the intermediate version of the code.

In some implementations, the rules for mapping the code to different portions of the intermediate version of the code may include a rule identifying a code section in the code, and mapping the code section to a corresponding portion of the intermediate version of the code. In some implementations, the rules for mapping the code to different portions of the intermediate version of the code may include a rule identifying a text section in the code, and mapping the text section to a corresponding portion of the intermediate version of the code. In some implementations, the rules for mapping the code to different portions of the intermediate version of the code may include a rule identifying an output of the code, and mapping the output to a corresponding portion of the intermediate version of the code.

In some implementations, the different portions of intermediate version of the code may provide a mapping of the code to the intermediate version of the code. In some implementations, the different portions of the intermediate version of the code can be assembled to form an intermediate view or document, as shown and described above in connection with one or more of FIGS. 1A, 1B, 4A-4D, 5A, and 6A, and/or a presentation view or document, as shown and described above in connection with one or more of FIGS. 1B, 4B-4E, 5B-5F, 6B-6E, and 7A-7D.

As further shown in FIG. 8, process 800 may include analyzing the intermediate version of the code based on rules for creating a presentation (block 830). For example, client device 210 may analyze the intermediate version of the code based on rules for creating a presentation. In some implementations, client device 210 may not create the intermediate version of the code, and may analyze the code directly based on rules for creating a presentation. In some implementations, client device 210 may receive the rules for creating a presentation from a storage device (e.g., memory 330 and/or storage component 340, FIG. 3). In some implementations, client device 210 (e.g., TCE 220) may enable a user to configure the rules for creating the presentation, create the rules, or the like. For example, a user may cause client device 210 to create or open a user interface that displays the rules for creating a presentation. One or more rules may be configured by the user via the user interface. In some implementations, the rules for creating a presentation may be different for different types of code or based on a purpose of the code.

In some implementations, the rules for creating a presentation may include rules for creating a title slide of the presentation. In some implementations, the rules for creating the title slide of the presentation may include a rule utilizing a title, or a first heading, of the intermediate version of the code as a title for the title slide. In some implementations, the rules for creating the title slide may include a rule for utilizing copyright information (if present) of the intermediate version of the code in a portion of the title slide (e.g., a lower right hand corner, a lower left corner, or the like).

In some implementations, the rules for creating the title slide may include a rule for utilizing an output (e.g., an image, a figure, or the like) of the intermediate version of the code in a portion of the title slide. For example, a most relevant output (e.g., a most relevant figure) of the intermediate version of the code may be provided in a portion of the title slide. In such an example, client device 210 may identify the outputs of the intermediate version of the code, may rank the identified outputs based on a number of occurrences of the identified outputs, and may select a highest ranked identified output as the most relevant output. In another example, client device 210 may provide a first output (e.g., a first figure) of the intermediate version of the code in a portion of the title slide. In still another example, client device 210 may provide one or more outputs (e.g., figures), generated by execution of the code, in a portion of the title slide.

In some implementations, the rules for creating a presentation may include a rule for creating titles of subsequent slides of the presentation based on the intermediate version of the code. For example, if the intermediate version of the code includes a title and does not include headers, client device 210 may utilize the title of the intermediate version of the code as the titles of the subsequent slides. In another example, if a section of the intermediate version of the code includes a header, client device 210 may utilize the header as a title of one of the subsequent slides. In still another example, if the intermediate version of the code does not include titles or headers, client device 210 may utilize a first sentence of a section of the intermediate version of the code as a title of one of the subsequent slides.

In some implementations, the rules for creating a presentation may include a rule for spacing of text in the subsequent slides of the presentation based on the intermediate version of the code. For example, if the intermediate version of the code includes a single paragraph, client device 210 may provide the single paragraph in one of the subsequent slides. In such an example, client device 210 may automatically size the text and/or spacing of the single paragraph in the subsequent slide based on a number of words in the single paragraph, available space in the subsequent slide, or the like. In another example, if the intermediate version of the code includes multiple paragraphs, client device 210 may provide the multiple paragraphs as bullets in one or more of the subsequent slides. In such an example, client device 210 may automatically size the text and/or spacing of each of the multiple paragraphs in the subsequent slide(s) based on a number of words in each paragraph, available space in the subsequent slide(s), or the like.

In some implementations, the rules for creating a presentation may include rules for formatting the subsequent slides of the presentation based on the intermediate version of the code. In some implementations, the rules for formatting the subsequent slides may include a rule for displaying paragraphs of the intermediate version of the code. For example, if the intermediate version of the code includes multiple paragraphs, client device 210 may sequentially provide the multiple paragraphs in the subsequent slides. In such an example, client device 210 may sequentially display the multiple paragraphs, via the subsequent slides, when the presentation is executed as a slide show. In some implementations, the rules for formatting the subsequent slides may include a rule for displaying text and code of the intermediate version of the code. For example, if text and related code of the intermediate version of the code can fit on one subsequent slide, client device 210 may provide the text before the related code in the subsequent slide. In some implementations, the rules for formatting the subsequent slides may include a rule for displaying code and outputs of the intermediate version of the code. For example, if code of the intermediate version of the code generates an output, client device 210 may provide the generated output with the code in a subsequent slide. In some implementations, the rules for formatting the subsequent slides may include a rule for displaying multiple code portions of the intermediate version of the code. For example, if the intermediate version of the code includes multiple code portions, client device 210 may sequentially provide the multiple code portions in the subsequent slides. In such an example, client device 210 may sequentially display the multiple code portions, via the subsequent slides, when the presentation is executed as a slide show.

In some implementations, the rules for formatting the subsequent slides may include a rule for displaying a header, text, code, and output of the intermediate version of the code. For example, if the intermediate version of the code includes a header, text (e.g., a paragraph), code, and output of the code, client device 210 may size the header, the text, the code, and the output to fit on one of the subsequent slides. If client device 210 determines that the header, the text, the code, and the output cannot fit on one of the subsequent slides, client device 210 may provide the header and the text on one of the subsequent slides and may provide the header, the code, and the output on another one of the subsequent slides. If client device 210 determines that code cannot fit on one of the subsequent slides, client device 210 may partition the code into code portions, and may provide the code portions, and outputs generated by the code portions, on multiple subsequent slides. If client device 210 determines that text cannot fit on one of the subsequent slides, client device 210 may partition the text into text portions, may provide the text portions on multiple subsequent slides, and may add an indication (e.g., "continued") in the titles of the subsequent slides.

In some implementations, the rules for formatting the subsequent slides may include a rule for altering a portion of the code of the intermediate version of the code. For example, the rule for altering the portion of the code may cause client device 210 to change only the size of the portion of the code (e.g., except for comments in the portion of the code, which client device 210 may automatically wrap). In another example, the rule for altering the portion of the code may cause client device 210 to enlarge the portion of the code as much as possible to fit on a subsequent slide. In some implementations, the rules for formatting the subsequent slides may include a rule for altering outputs of the intermediate version of the code. For example, the rule for altering outputs of the intermediate version of the code may cause client device 210 to automatically size the outputs to fit in any portion of the subsequent slides (e.g., above text, below text, to the left of text, or to the right of text). In some implementations, the rules for formatting the subsequent slides may include a rule for altering text of the intermediate version of the code. For example, the rule for altering text of the intermediate version of the code may cause client device 210 to wrap the text, if needed, to fit outputs (e.g., images), code, or the like on a subsequent slide. In another example, the rule for altering text of the intermediate version of the code may cause client device 210 to limit a reduction in a size of the text (e.g., size to a particular font size so that the text may be read) and to break one slide into two slides if necessary to limit the reduction in size.

As further shown in FIG. 8, process 800 may include creating a presentation for the code or a portion of the code based on the analysis (block 840). For example, client device 210 may automatically create a presentation for the code (or a portion of the code) based on the analysis of the intermediate version of the code. In some implementations, as described above in connection with FIG. 5A, client device 210 may analyze the intermediate version of the code (e.g., provided in intermediate code view 515) based on rules for creating a presentation, and may automatically create a presentation for the code (or a portion of the code), based on the analysis of the intermediate version of the code. In some implementations, client device 210 may create a presentation that includes the slides depicted in FIGS. 5B-5F.

As further shown in FIG. 8, process 800 may include linking the presentation slides to appropriate portions of the code and displaying and/or storing the presentation (block 850). For example, client device 210 may link the slides of the presentation to appropriate portions of the code. In some implementations, client device 210 may utilize a data structure for linking the slides of the presentation to the appropriate portions of the code. For example, the data structure may include a code field with entries that identify different lines of code and a slide field with entries that identify slides of the presentation that correspond to the entries provided in the code field.

In some implementations, client device 210 may provide the presentation for display and/or may store the presentation. In some implementations, client device 210 may store the presentation in a memory (e.g., main memory 330 and/or storage component 340 of FIG. 3) associated with client device 210. In some implementations, client device 210 may display the presentation in a user interface that includes the code and/or the intermediate version of the code. For example, the presentation may be provided in a first window (e.g., a presentation window) of TCE 220, the code may be provided in a second window (e.g., a code window) of TCE 220, and/or the intermediate version of the code may be provided in a third window (e.g., a publication window) of TCE 220. In some implementations, client device 210 may export or convert the presentation into a format compatible with presentation software (e.g., PowerPoint®, Custom-Show, Prezi®, SlideShark™, or the like).

As further shown in FIG. 8, process 800 may include receiving a modification to the code (block 860). For example, client device 210 may receive a modification to the code. In some implementations, the modification to the code may include a modification to one or more lines of the code. In some implementations, client device 210 may receive the modification to the code via the presentation (e.g., via a presentation window containing the presentation and provided by TCE 220). For example, a user may cause client device 210 to create or open the presentation window. One or more lines of the code may be modified via the presentation window. For example, in some implementations, client device 210 may receive a command, from the user, that indicates that a line of code is to be modified in the presentation window. Client device 210 may receive the command based on, for example, detecting a selection of a particular menu item, entry of a particular textual or audible input from the user, and/or entry of some other predetermined input that indicates a desire to modify a line of code in the presentation window.

In some implementations, client device 210 may receive the modification to the code via the intermediate version of the code (e.g., via a publication window containing the intermediate version of the code and provided by TCE 220). For example, a user may cause client device 210 to create or open the publication window. One or more lines of the code may be modified via the publication window. For example, in some implementations, client device 210 may receive a command, from the user, that indicates that a line of code is to be modified in the publication window. Client device 210 may receive the command based on, for example, detecting a selection of a particular menu item, entry of a particular textual or audible input from the user, and/or entry of some other predetermined input that indicates a desire to modify a line of code in the publication window.

In some implementations, client device 210 may receive the modification to the code via a code window containing the code and provided by TCE 220. For example, a user may cause client device 210 to create or open the code window. One or more lines of the code may be modified via the code window. For example, in some implementations, client device 210 may receive a command, from the user, that indicates that a line of code is to be modified in the code window. Client device 210 may receive the command based on, for example, detecting a selection of a particular menu item, entry of a particular textual or audible input from the user, and/or entry of some other predetermined input that indicates a desire to modify a line of code in the code window.

As further shown in FIG. 8, process 800 may include modifying the presentation for the code based on the modification to the code (block 870). For example, client device 210 may modify the presentation for the code based on the modification to the code. In some implementations, client device 210 may modify title(s), text, formatting, code, output(s) provided on the slides of the presentation based on the modification to the code and/or the rules for creating a presentation (described above). For example, if the modification to the code changes an image output by the code, and provided in a slide of the presentation, client device 210 may provide the changed image in the slide of the presentation. In another example, if the modification to the code includes adding new lines of code, to particular code provided in a slide of the presentation, client device 210 may resize the particular code so that the particular code fits in the slide.

As further shown in FIG. 8, process 800 may include displaying and/or storing the modified presentation for the code (block 880). For example, client device 210 may provide the modified presentation for display and/or may store the modified presentation. In some implementations, client device 210 may store the modified presentation in a memory (e.g., main memory 330 and/or storage component 340 of FIG. 3) associated with client device 210. In some implementations, client device 210 may display the modified presentation in a user interface that includes the code and/or the intermediate version of the code. For example, the modified presentation may be provided in a first window (e.g., a presentation window) of TCE 220, the code may be provided in a second window (e.g., a code window) of TCE 220, and/or the intermediate version of the code may be provided in a third window (e.g., a publication window) of TCE 220. In some implementations, client device 210 may export or convert the modified presentation into a format compatible with presentation software.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Systems and/or methods, described herein, may automatically generate a presentation based on code, and may enable the code to be executed and/or modified via the presentation. The systems and/or methods may utilize the code structure, annotations for the code, and/or other information associated with the code to create the presentation. The systems and/or methods may determine (e.g., based on the code) slide titles, bullets, animation, how to partition the code, or the like for the presentation. The presentation may be utilized for performing a code review or for presenting to an audience of people.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Code (sometimes referred to herein as program code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, or the like), binary code that may be executed (e.g., executable files that may be directly executed by an operating system, bitstream files that may be used to configure an FPGA, Java byte code, object files combined together with linker directives, source code, makefiles, or the like), text files that may be executed in conjunction with other executables (e.g., PYTHON™ text files, OCTAVE™ files, a collection of dynamic-link library (DLL) files with text-based combining, configuration information that connects pre-compiled modules, an extensible markup language (XML) file describing module linkage, or the like), source code (e.g., readable by a human), machine code (e.g., readable by a machine), or the like. In some implementations, code may include different combinations of the above-identified classes of code (e.g., text-based code, binary code, text files, source code, machine code, or the like). Additionally, or alternatively, code may include code generated using a dynamically-typed programming language (e.g., the M language, a MATLAB® language, a MATLAB-compatible language, a MATLAB-like language, or the like) that may be used to express problems and/or solutions using mathematical notations. Additionally, or alternatively, code may be of any type, such as a function, a script, an object, or the like.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
applying, by one or more processors and to program code, one or more first rules for mapping one or more portions of the program code to different portions of an intermediate version of the program code;
generating, by the one or more processors, the intermediate version of the program code based on applying the one or more first rules;
applying, by the one or more processors and to the intermediate version of the program code, one or more second rules for determining one or more first portions of the intermediate version of the program code to include in a first slide of a presentation and one or more second portions of the intermediate version of the program code to include in a second slide of the presentation to be generated from the program code, applying the one or more second rules including:
determining the one or more first portions of the intermediate version of the program code and the one or more second portions of the intermediate version of the program code cannot fit on the first slide of the presentation,
providing the one or more first portions of the intermediate version of the program code on the first slide of the presentation based on the one or more first portions of the intermediate version of the program code and the one or more second portions of the intermediate version of the program code being determined not to fit on the first slide of the presentation, and
providing the one or more second portions of the intermediate version of the program code on the second slide of the presentation based on the one or more first portions of the intermediate version of the program code and the one or more second portions of the intermediate version of the program code being determined not to fit on the first slide of the presentation; and generating, by the one or more processors, the presentation from the program code based on applying the one or more second rules to the intermediate version of the program code,
where generating the presentation from the program code based on applying the one or more second rules includes:
creating at least one of an image or a movie based on transitions that a figure goes through during execution of dynamic elements of the program code; and
embedding at least one of the image or the movie into the presentation.

2. The method of claim 1, further comprising:
receiving, via a presentation view, a modification to a portion of program code included in the presentation; and
modifying the presentation, the intermediate version of the program code, and the program code based on the modification to the portion of program code included in the presentation.

3. The method of claim 2, where receiving the modification to the program code includes one of:
receiving the modification to the portion of program code via the presentation, or
receiving the modification to the portion of program code via a user interface displaying the program code.

4. The method of claim 1, further comprising:
executing the program code, via the presentation, to generate outputs; and
providing for display, in the presentation and as an animation, the outputs generated by the execution of the program code.

5. The method of claim 1, further comprising:
creating a formatted version of the program code based on the program code and based on outputs generated by execution of the program code;
analyzing the formatted version of the program code based on the one or more second rules; and
generating the presentation for the program code based on the analyzing the formatted version of the program code.

6. The method of claim 1, where the one or more second rules includes one or more of:
a rule for creating a title slide of the presentation,
a rule for creating titles for subsequent slides of the presentation, or
a rule for formatting the subsequent slides of the presentation.

7. The method of claim 1, further comprising:
converting the presentation into a format compatible with presentation software and to generate a converted presentation; and
outputting the converted presentation.

8. The method of claim 1, further comprising:
identifying a plurality of outputs generated based on execution of the program code;
ranking each output, of the plurality of outputs, based a number of times each output is generated based on execution of the program code; and
providing a highest ranked output, of the plurality of outputs, in a title slide of the presentation.

9. The method of claim 1, where the intermediate version of the program code comprising a header, text, code, and an output of the code, and
where applying the one or more second rules includes:
determining the header, the text, the code, and the output of the code cannot fit on the first slide of the presentation,
providing the header and the text on the first slide of the presentation based on the header, the text, the code, and the output of the code being determined not to fit on the first slide of the presentation, and
providing the header, the code, and the output of the code on the second slide of the presentation based the header, the text, the code, and the output of the code being determined not to fit on the first slide of the presentation.

10. The method of claim 1, where the intermediate version of the program code comprises a header, and
where the header is included in the first slide of the presentation and the second slide of the presentation based on the one or more first portions of the intermediate version of the program code and the one or more second portions of the intermediate version of the program code being determined not to fit on the first slide of the presentation.

11. The method of claim 1, where the image is created, and
where the image includes a figure output from the program code that is linked to the program code when the presentation is displayed in a presentation view.

12. A computer-readable medium for storing instructions, the instructions comprising:
one or more instructions that, when executed by one or more processors of a device, cause the one or more processors to:
apply, to program code, one or more first rules for mapping one or more portions of the program code to different portions of an intermediate version of the program code;
generate the intermediate version of the program code based on applying the one or more first rules;
apply, to the intermediate version of the program code, one or more second rules for determining one or more first portions of the intermediate version of the program code to include in a first slide of a presentation and one or more second portions of the intermediate version of the program code to include in a second slide of the presentation to be generated from the program code,
the one or more instructions, that cause the one or more processors to apply the one or more second rules, cause the one or more processors to:
determine the one or more first portions of the intermediate version of the program code and the one or more second portions of the intermediate version of the program code cannot fit on the first slide of the presentation, provide the one or more first portions of the intermediate version of the program code on the first slide of the presentation based on the one or more first portions of the intermediate version of the program code and the one or more second portions of the intermediate version of the program code being determined not to fit on the first slide of the presentation, and provide the one or more second portions of the intermediate version of the program code on the second slide of the presentation based on the one or more first portions of the intermediate version of the program code and the one or more second portions of the intermediate version of the program code being determined not to fit on the first slide of the presentation; and generate the presentation from the program code based on applying the one or more second rules to the intermediate version of the program code, where the one or more instructions, that cause the one or more processors to generate the presentation from the program code based on applying the one or more second rules, cause the one or more processors to:

create at least one of an image or a movie based on transitions that a figure goes through during execution of dynamic elements of the program code; and embed at least one of the image or the movie into the presentation.

13. The computer-readable medium of claim 12, where the one or more instructions, when executed by the one or more processors, further cause the one or more processors to:

receive, via a presentation view, a modification to a portion of program code; and modify the presentation, the intermediate version of the program code, and the program code based on the modification to the portion of program code included in the presentation made via the presentation via.

14. The computer-readable medium of claim 12, where the one or more instructions, when executed by the one or more processors, further cause the one or more processors to:

execute the program code, via the presentation, to generate outputs; and provide the outputs for display in the presentation.

15. The computer-readable medium of claim 12, where the presentation comprises at least one slide that includes one or more of:

a title based on a title or a header provided in the program code, a portion of the program code, a particular output generated by execution of the portion of the program code, or a comment in the program code.

16. The computer-readable medium of claim 12, where the one or more second rules include one or more of:

a rule for creating a title slide of the presentation, a rule for creating titles for subsequent slides of the presentation, or a rule for formatting the subsequent slides of the presentation.

17. The computer-readable medium of claim 12, where the one or more instructions, when executed by the one or more processors, further cause the one or more processors to:

convert the presentation into a format compatible with presentation software and to generate a converted presentation; and output the converted presentation.

18. A device, comprising:

one or more processors to:

apply, to program code, one or more first rules for mapping one or more portions of the program code to different portions of an intermediate version of the program code;

generate the intermediate version of the program code based on apply the one or more first rules;

apply, to the intermediate version of the program code, one or more second rules for determining one or more first portions of the intermediate version of the program code to include in a first slide of a presentation and one or more second portions of the intermediate version of the program code to include in a second slide of the presentation to be generated from the program code, the one or more processors, when applying the one or more second rules, are to:

determine the one or more first portions of the intermediate version of the program code and the one or more second portions of the intermediate version of the program code cannot fit on the first slide of the presentation, provide the one or more first portions of the intermediate version of the program code on the first slide of the presentation based on the one or more first portions of the intermediate version of the program code and the one or more second portions of the intermediate version of the program code being determined not to fit on the first slide of the presentation, and provide the one or more second portions of the intermediate version of the program code on the second slide of the presentation based on the one or more first portions of the intermediate version of the program code and the one or more second portions of the intermediate version of the program code being determined not to fit on the first slide of the presentation; and generate the presentation from the program code based on applying the one or more second rules to the intermediate version of the program code;

where the one or more processors, when generating the presentation from the program code based on applying the one or more second rules, are to:

create at least one of an image or a movie based on transitions that a figure goes through during execution of dynamic elements of the program code; and embed at least one of the image or the movie into the presentation.

19. The device of claim 18, where the one or more processors are further to:

receive a modification to the program code via one of the presentation, the intermediate version of the program code, or a user interface displaying the program code;

modify the presentation, based on the modification to the program code, to generate a modified presentation; and provide the modified presentation for display.

20. The device of claim 18, where the one or more processors are further to:
  execute the program code via the presentation to generate outputs; and
  provide for display, in the presentation, the outputs generated by execution of the program code.

21. The device of claim 18, where the one or more second rules include one or more of:
  a rule for creating slides of the presentation,
  a rule for providing comments, provided in the program code, in the slides of the presentation,
  a rule for providing the program code in the slides of the presentation, or
  a rule for providing outputs, generated when the program code is executed, in the slides of the presentation.

22. The device of claim 18, where the one or more processors are further to:
  identify a plurality of outputs generated based on execution of the program code;
  rank each output, of the plurality of outputs, based a number of times each output is generated based on execution of the program code; and
  provide a highest ranked output, of the plurality of outputs, in a title slide of the presentation.

* * * * *